(12) United States Patent
Yamamoto et al.

(10) Patent No.: US 10,989,123 B2
(45) Date of Patent: Apr. 27, 2021

(54) CONTROLLER AND CONTROL METHOD FOR INTERNAL COMBUSTION ENGINE

(71) Applicant: TOYOTA JIDOSHA KABUSHIKI KAISHA, Toyota (JP)

(72) Inventors: Yoshikazu Yamamoto, Aichi-gun (JP); Kazuya Ohshima, Toyota (JP); Masaya Kubo, Toyota (JP); Yuichiroh Yamanaka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/526,631

(22) Filed: Jul. 30, 2019

(65) Prior Publication Data
US 2020/0063666 A1 Feb. 27, 2020

(30) Foreign Application Priority Data
Aug. 27, 2018 (JP) .............................. JP2018-158112

(51) Int. Cl.
*F02D 41/00* (2006.01)
*F02D 33/02* (2006.01)
*F02M 23/04* (2006.01)
*F02D 43/04* (2006.01)

(52) U.S. Cl.
CPC .............. *F02D 33/02* (2013.01); *F02D 43/04* (2013.01); *F02M 23/04* (2013.01); *F02D 2200/0614* (2013.01)

(58) Field of Classification Search
CPC ... Y02T 10/18; F02D 2041/001; F02D 33/02; F02D 43/04; F02D 2200/0614; F02M 23/04
See application file for complete search history.

(56) References Cited

U.S. PATENT DOCUMENTS

| | | | |
|---|---|---|---|
| 8,387,588 B2 * | 3/2013 | Ashizawa | F02B 23/101 123/301 |
| 2008/0178836 A1 * | 7/2008 | Yamashita | F02M 26/01 123/295 |
| 2011/0192380 A1 * | 8/2011 | Tomimatsu | F02D 41/1497 123/493 |
| 2011/0290218 A1 * | 12/2011 | Yoshioka | F02D 21/08 123/48 R |

(Continued)

FOREIGN PATENT DOCUMENTS

| | | |
|---|---|---|
| JP | 2014-034943 A | 2/2014 |
| JP | 2014-101784 A | 6/2014 |

(Continued)

*Primary Examiner* — Gonzalo Laguarda
(74) *Attorney, Agent, or Firm* — Oliff PLC

(57) ABSTRACT

A blowback air amount is an amount of air that is part of the air that has flowed into a combustion chamber and is blown back into an intake passage before an intake valve closes. If the blowback air amount increases, a controller causes a fuel injection valve to inject fuel by an amount increased with respect to a fuel amount for a case in which the blowback air amount remains constant. The controller sets an increase amount of fuel injected from the fuel injection valve to a greater value when the stoichiometric air-fuel ratio of the fuel injected from the fuel injection valve is small than when the stoichiometric air-fuel ratio of the fuel injected from the fuel injection valve is great.

10 Claims, 8 Drawing Sheets

(56) References Cited

U.S. PATENT DOCUMENTS

2015/0122218 A1    5/2015  Wakao et al.
2016/0348607 A1    12/2016  Ishimatsu et al.
2017/0009682 A1*  1/2017  Okunishi ................ F01P 11/16

FOREIGN PATENT DOCUMENTS

| JP | 2016-223438 A | 12/2016 |
| WO | 2014/006761 A1 | 1/2014 |

* cited by examiner

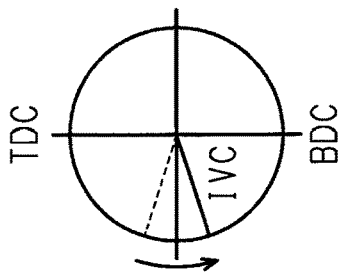
Fig.7A
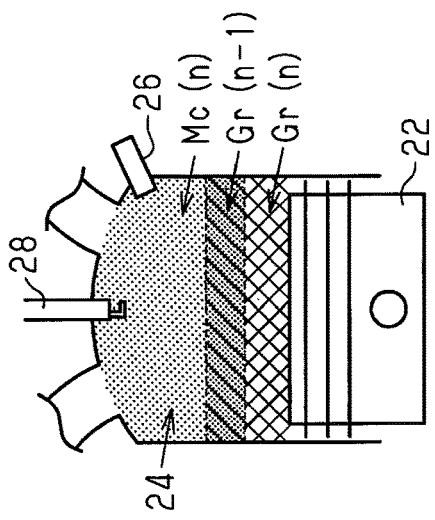
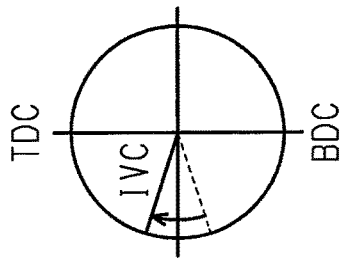
Fig.7B
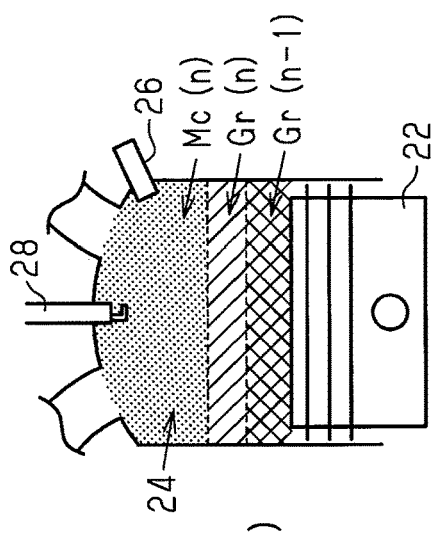
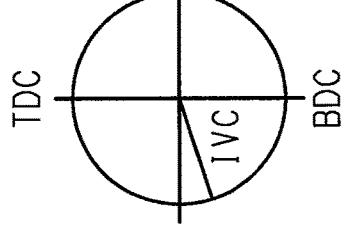
Fig.7C
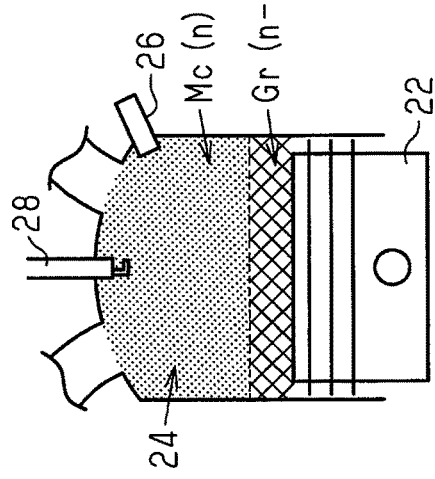

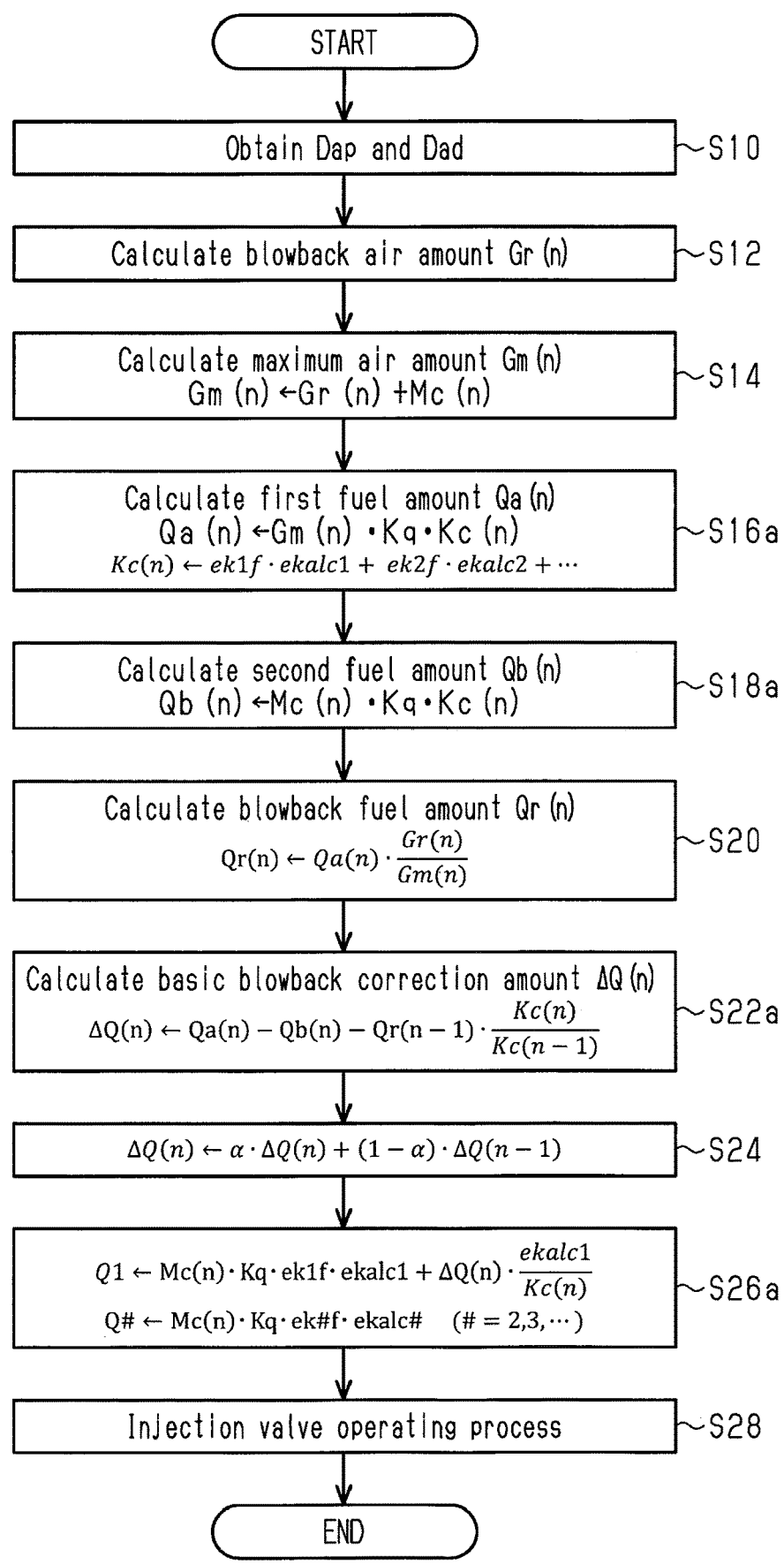

CONTROLLER AND CONTROL METHOD FOR INTERNAL COMBUSTION ENGINE

BACKGROUND

1. Field

The present disclosure relates to a controller and a control method for an internal combustion engine. An internal combustion engine as the control target of the controller and the control method includes a fuel injection valve that injects and delivers fuel into a combustion chamber. The valve closing timing of the intake valve of the engine can be retarded with respect to the bottom dead center.

2. Description of Related Art

For example, International Publication No. 2014/006761 describes a controller for an internal combustion engine that may use a fuel containing hydrocarbon fuel and alcohol and includes a port injection valve and a direct injection valve. When the alcohol concentration of the fuel is changed by, for example, refueling, the alcohol concentration of the fuel injected from the port injection valve and the alcohol concentration of the fuel injected from the direct injection valve become different from each other. The controller cancels such difference in the alcohol concentration quickly by injecting the fuel from both of the port injection valve and the direct injection valve.

Also known are controllers for internal combustion engines that variably set the valve closing timing of the intake valve. Particularly known is a controller for an internal combustion engine that controls the valve closing timing of the intake valve to be retarded with respect to the bottom dead center when the engine is in a certain operating state.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Examples of the present disclosure will now be described.

Example 1

A controller for an internal combustion engine is provided. The engine includes a fuel injection valve that injects and delivers fuel into a combustion chamber. A valve closing timing of an intake valve of the engine can be retarded with respect to a bottom dead center. The controller is configured to perform: a blowback air amount calculating process of calculating a blowback air amount, wherein the blowback air amount is an amount of air that is part of the air that has flowed into the combustion chamber and is blown back into an intake passage before the intake valve closes; an obtaining process of obtaining a stoichiometric air-fuel ratio information of fuel injected from the fuel injection valve; and an operating process of operating the fuel injection valve to control an air-fuel ratio of air-fuel mixture to be burned in the combustion chamber 24 to a target value. The operating process includes a process that, if the blowback air amount increases: causes the fuel injection valve to inject fuel by an amount increased with respect to a fuel amount for a case in which the blowback air amount remains constant; and sets an increase amount of the fuel injected from the fuel injection valve greater when a stoichiometric air-fuel ratio of the fuel injected from the fuel injection valve is small than when the stoichiometric air-fuel ratio of the fuel injected from the fuel injection valve is great.

In cases in which some of the air-fuel mixture is blown back from the combustion chamber into the intake passage, the amount of fuel in the blown-back air-fuel mixture depends on the amount of air that is blown back. That is, if the amount of blown-back air increases, the amount of fuel in the blown-back air-fuel mixture tends to increase as well. Therefore, the amount of fuel appropriate for controlling the air-fuel ratio of the air-fuel mixture to be burned to achieve the control value when the amount of blown-back air increases tends to become greater than the fuel amount necessary for the aforementioned controlling when the amount of blown-back air does not increase. That is, the blowback air amount has a close positive correlation with the amount of fuel in the blown-back air-fuel mixture. Therefore, in the above-described configuration, the blowback air amount calculating process is performed. If, the obtained blowback air amount increases, the amount of fuel injected from the fuel injection valve is increased.

However, a greater amount of fuel tends to be needed to control the aforementioned air-fuel ratio to achieve the target value in a case in which injected fuel has a small stoichiometric air-fuel ratio than in a case in which the injected fuel has a great stoichiometric air-fuel ratio, even when the increase amount of air blown back into the intake passage are equal in the two cases. Generally, the stoichiometric air-fuel ratio of injected fuel tends to become smaller as the alcohol concentration of the injected fuel becomes greater. Therefore, in the above-described configuration, the increase amount of the fuel injected from the fuel injection valve for a case in which the amount of air blown back into the intake passage increases is set greater for fuel with a small stoichiometric air-fuel ratio than for fuel with a great stoichiometric air-fuel ratio. This limits lowering of controllability caused by blowback when controlling exhaust gas components in a desirable manner.

If the valve closing timing of the intake valve is retarded with respect to the bottom dead center, some of the air-fuel mixture in the combustion chamber is blown back into the intake passage before the intake valve closes. In this case, the blown-back air-fuel mixture may cause an error in the controlling of the air-fuel ratio of the air-fuel mixture to be burned to achieve the control value. To solve this problem, the air-fuel mixture blown back into the intake passage must be addressed. However, the aforementioned document does not disclose how controlling should be carried out in correspondence with the alcohol concentration of the fuel injected from the fuel injection valve if the engine uses fuel containing hydrocarbon fuel and alcohol. In contrast, the above-described configuration provides a solution to this problem.

Example 2

In the controller of Example 1, the operating process includes a process in which, if the blowback air amount decreases: the fuel injection valve is caused to inject fuel by an amount decreased with respect to the fuel amount for a case in which the blowback air amount remains constant; and a decrease amount of the fuel injected from the fuel injection valve is set greater when the stoichiometric air-fuel ratio of the fuel injected from the fuel injection valve is small than when the stoichiometric air-fuel ratio of the fuel injected from the fuel injection valve is great.

When the amount of air blown back from the combustion chamber into the intake passage decreases, the amount of fuel in the blown-back air-fuel mixture tends to decrease as well. As a result, the amount of fuel appropriate for controlling the air-fuel ratio of the air-fuel mixture to be burned to achieve the control value when the amount of blown-back air decreases tends to become smaller than the fuel amount necessary for the aforementioned controlling when the amount of blown-back air does not decrease. Therefore, in the above-described configuration, the amount of fuel injected from the fuel injection valve is decreased if the blowback air amount decreases.

However, a greater amount of fuel tends to be needed to control the aforementioned air-fuel ratio to achieve the target value when the stoichiometric air-fuel ratio of injected fuel is small than when the stoichiometric air-fuel ratio of injected fuel is great. Therefore, in the above-described configuration, the decrease amount of fuel for a case in which the amount of blown-back air decreases is set greater for fuel with a small stoichiometric air-fuel ratio than for fuel with a great stoichiometric air-fuel ratio. This limits lowering of the controllability caused by blowback when controlling exhaust gas characteristics in a desirable manner.

Example 3

In the controller of Example 2, the operating process includes an excess/deficiency amount calculating process of calculating an excess/deficiency amount obtained by converting a difference obtained by subtracting an amount of fuel that was blown back in a previous cycle from an amount of fuel that is blown back before the intake valve closes into a value for a case in which the stoichiometric air-fuel ratio of the fuel is assumed to be a specific value. If the excess/deficiency amount is a positive value, the operating process causes the fuel injection valve to inject fuel by an amount increased with respect to a fuel amount for a case in which the excess/deficiency amount is zero, and sets the increase amount of the fuel injected from the fuel injection valve greater when the stoichiometric air-fuel ratio of the injected fuel is small than when the stoichiometric air-fuel ratio of the injected fuel is great. If the excess/deficiency amount is a negative value, the operating process causes the fuel injection valve to inject fuel by an amount decreased with respect to the fuel amount for a case in which the excess/deficiency amount is zero, and sets the decrease amount of the fuel injected from the fuel injection valve greater when the stoichiometric air-fuel ratio of the injected fuel is small than when the stoichiometric air-fuel ratio of the injected fuel is great.

In the above-described configuration, the difference between the previous blowback fuel amount and the current blowback fuel amount is calculated as an excess/deficiency amount for a case in which stoichiometric air-fuel ratio of blown-back fuel is assumed to be a specific value. In performing correction in correspondence with the excess/deficiency amount, the correction amount is varied depending on the stoichiometric air-fuel ratio of the fuel. That is, whether the fuel amount should be increased or decreased is determined depending on the excess/deficiency amount that is not influenced by a change in the stoichiometric air-fuel ratio of the fuel. The increase or decrease amount at this stage is variably set based on the stoichiometric air-fuel ratio information. As a result, even at a transient stage at which the stoichiometric air-fuel ratio of the fuel changes, fuel injection is performed by an amount appropriate for controlling exhaust gas characteristics in a desirable manner.

Example 4

In the controller of Example 3, the operating process includes: a process of performing a plurality of times of fuel injections to control the air-fuel ratio of the air-fuel mixture to be burned in the combustion chamber to the target value; and a process in which, when the plurality of times of fuel injections are carried out, a correction target that is corrected in correspondence with the excess/deficiency amount is an initial-time fuel injection amount.

The amount of fuel blown back into the intake passage tends to become smaller when the starting timing of fuel injection is retarded than when the starting timing of fuel injection is advanced. Accurate determination of the decrease amount is difficult. To solve this problem, in the above-described configuration, the amount of fuel injected in the initial-time fuel injection is increased or decreased. This ensures accurate determination of the amount influenced by the blown-back air-fuel mixture in the correction amount corresponding to the excess/deficiency amount.

Example 5

In the controller of any one of Examples 1 to 4, the fuel injection valve includes a port injection valve that injects fuel into the intake passage and a direct injection valve that injects fuel into the combustion chamber. The obtaining process is a process of separately obtaining port injection information as stoichiometric air-fuel ratio information of the fuel injected from the port injection valve and direct injection information as stoichiometric air-fuel ratio information of the fuel injected from the direct injection valve. The operating process includes a process that: sets the amount of fuel injected from the port injection valve greater when the stoichiometric air-fuel ratio of the fuel corresponding to the port injection information is small than when the stoichiometric air-fuel ratio of the fuel corresponding to the port injection information is great; and sets the amount of fuel injected from the direct injection valve greater when the stoichiometric air-fuel ratio of the fuel corresponding to the direct injection information is small than when the stoichiometric air-fuel ratio of the fuel corresponding to the direct injection information is great.

If the engine includes a port injection valve and a direct injection valve, refueling with fuel having a different stoichiometric air-fuel ratio, for example, may be followed by a transient period in which the fuel injected from the port injection valve and the fuel injected from the direct injection valve have mutually different stoichiometric air-fuel ratios. Therefore, in the above-described configuration, the injection amount is determined using the port injection information or the direct injection information, as selected depending on whether the fuel is injected from the port injection valve or the direct injection valve. This ensures fuel injection corresponding to the stoichiometric air-fuel ratio of the injected fuel.

Example 6

A control method for an internal combustion engine is provided that performs the various processes described in Examples 1 to 5.

Example 7

A non-transitory computer readable memory medium is provided that stores a program that causes a processing device to perform the various processes described in Examples 1 to 5.

Other features and aspects will be apparent from the following detailed description, the drawings, and the claims.

BRIEF DESCRIPTION OF THE DRAWINGS

FIGS. 7A, 7B, and 7C are views illustrating a problem to be solved by the engine of FIG. 1.

FIG. 9 is a flowchart representing the steps of an injection valve operating process according to a second embodiment of the present disclosure.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

A controller 60 for an internal combustion engine 10 according to a first embodiment of the present disclosure will now be described with reference to FIGS. 1 to 8.

Figure 1:
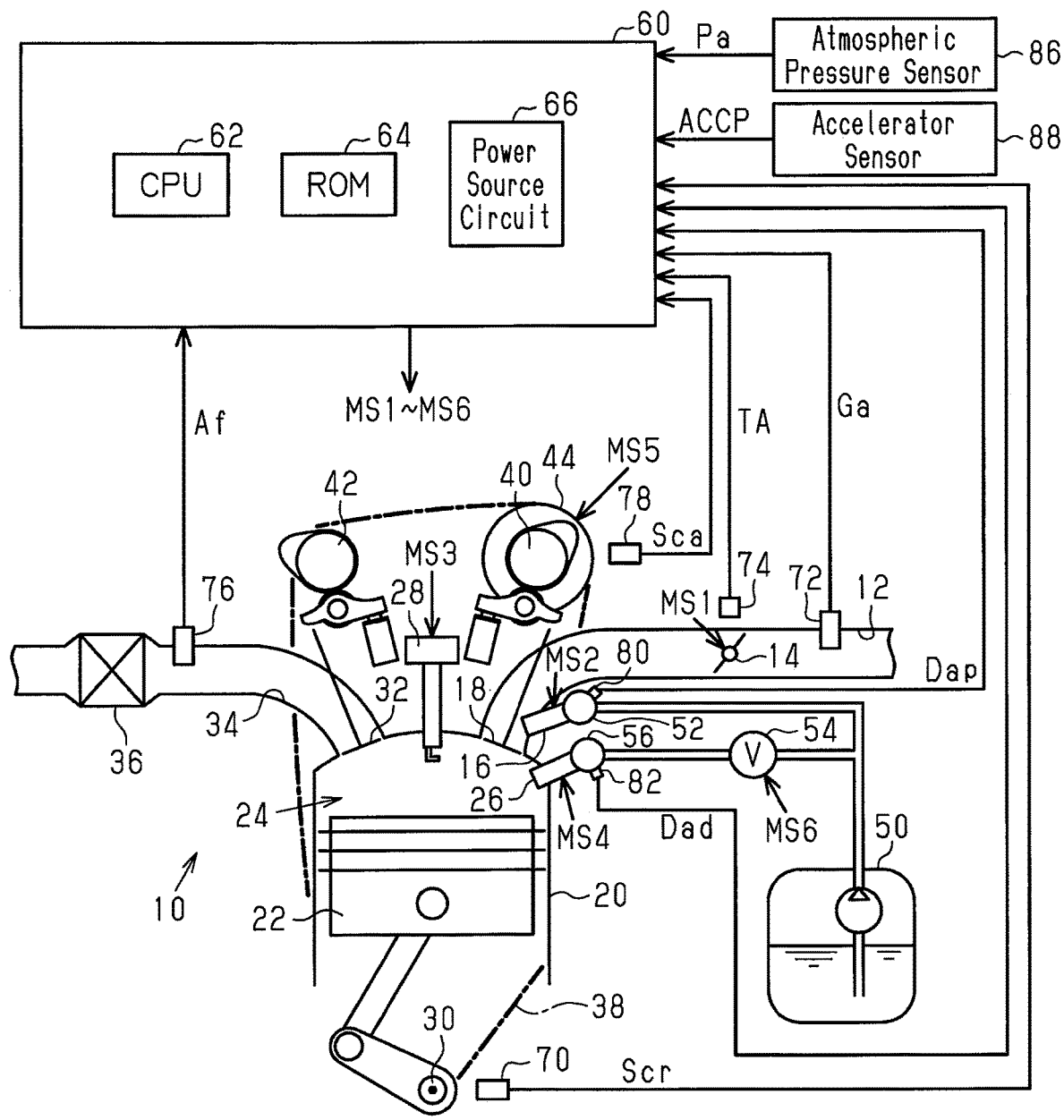
FIG. 1 is a diagram showing a controller and an internal combustion engine according to a first embodiment of the present disclosure.

The internal combustion engine 10, as shown in FIG. 1, is mounted in a vehicle. A throttle valve 14 is disposed in an intake passage 12 of the engine 10. A port injection valve 16 is arranged downstream of the throttle valve 14. Air is drawn into the intake passage 12 and fuel is injected from the port injection valve 16. The air and fuel flow into a combustion chamber 24 when an intake valve 18 opens. The combustion chamber 24 is defined by a cylinder 20 and a piston 22. A direct injection valve 26 is arranged in the combustion chamber 24. In the combustion chamber 24, air-fuel mixture of the fuel and air is burned by a spark discharged by an ignition device 28. The thus generated combustion energy is converted into rotation energy for a crankshaft 30 through the piston 22. The burned air-fuel mixture is discharged as exhaust gas into an exhaust passage 34 when an exhaust valve 32 opens. A catalyst 36 is disposed in the exhaust passage 34.

The rotation power of the crankshaft 30 is transmitted to an intake camshaft 40 and an exhaust camshaft 42 through a timing chain 38. In the present embodiment, the power of the timing chain 38 is transmitted to the intake camshaft 40 via an intake valve timing adjusting device 44. The intake valve timing adjusting device 44 is an actuator that adjusts the opening timing of the intake valve 18 by adjusting the rotational phase difference between the crankshaft 30 and the intake camshaft 40.

Fuel is retained in a fuel tank 50 before being injected from the port injection valve 16 or the direct injection valve 26. In the present embodiment, the fuel retained in the fuel tank 50 contains at least either gasoline or alcohol. Some of the fuel in the fuel tank 50 is delivered to the port injection valve 16 from a low-pressure delivery pipe 52. The rest of the fuel in the fuel tank 50 is pressurized by a pump 54 and delivered to a high-pressure delivery pipe 56. The fuel is then delivered from the high-pressure delivery pipe 56 to the direct injection valve 26.

The controller 60 controls the engine 10 as its control target. To control the torque and the ratios of exhaust gas components of the engine 10 as controlled amounts, the controller 60 operates operated portions of the engine 10, including the throttle valve 14, the port injection valve 16, the ignition device 28, the direct injection valve 26, the intake valve timing adjusting device 44, and the pump 54. In such controlling, the controller 60 refer to an output signal Scr from a crank angle sensor 70, the intake air amount Ga detected by an air flowmeter 72, the opening degree TA of the throttle valve 14 detected by a throttle sensor 74, and the air-fuel ratio Af detected by an air-fuel ratio sensor 76. The controller 60 also refers to an output signal Sca from an intake cam angle sensor 78, the alcohol concentration of the fuel in the low-pressure delivery pipe 52 (a port concentration Dap) detected by a port alcohol concentration sensor 80, and the alcohol concentration of the fuel in the high-pressure delivery pipe 56 (an in-cylinder concentration Dad) detected by an in-cylinder alcohol concentration sensor 82. Also, the controller 60 refers to the atmospheric pressure Pa detected by an atmospheric pressure sensor 86 and the depression amount of the accelerator pedal (an accelerator operating amount ACCP) detected by an accelerator sensor 88.

The controller 60 includes a CPU 62, a ROM 64, and a power supply circuit 66. The controller 60 controls the aforementioned controlled amounts by executing a program stored in the ROM 64 by means of the CPU 62. The power supply circuit 66 supplies electric power to components of the controller 60.

Figure 2:
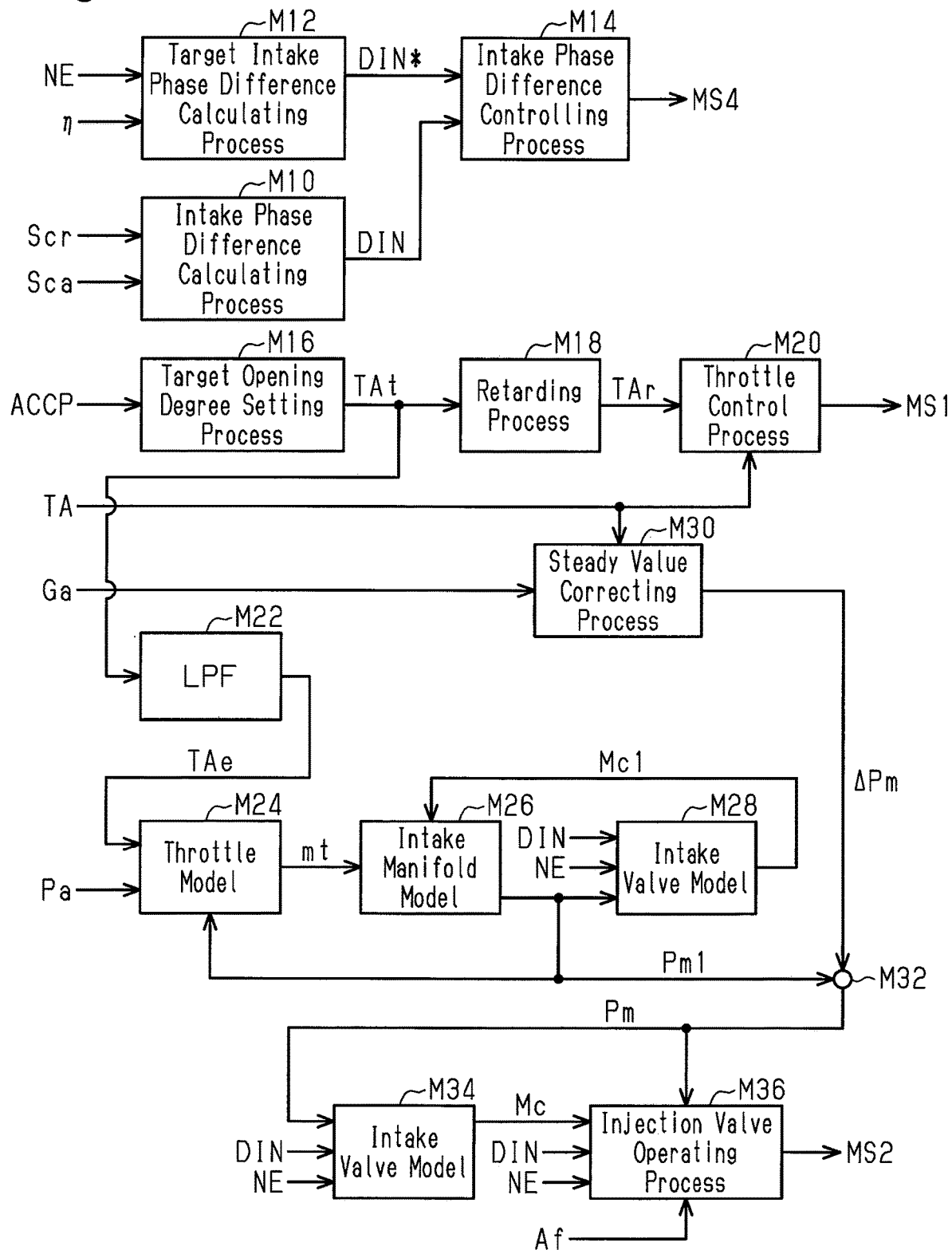
FIG. 2 is a block diagram representing a process performed by the controller in the engine of FIG. 1.

FIG. 2 represents a part of a process performed by the controller 60. The process is carried out by executing a program stored in the ROM 64 by means of the CPU 62.

An intake phase difference calculating process M10 is a process of calculating an intake phase difference DIN based on the output signal Scr from the crank angle sensor 70 and the output signal Sca from the intake cam angle sensor 78. The intake phase difference DIN is the phase difference of the rotational angle of the intake camshaft 40 with respect to the rotational angle of the crankshaft 30. A target intake phase difference calculating process M12 is a process of variably setting a target intake phase difference DIN* based on the operating point of the engine 10. In the present embodiment, the target intake phase difference calculating process M12 includes a process of setting the target intake phase difference DIN* such that the valve closing timing of the intake valve 18 (an intake valve closing timing IVC) is retarded with respect to the bottom dead center BDC. In the present embodiment, the operating point is defined by the rotation speed NE and the charging efficiency η. Specifically, the CPU 62 calculates the rotation speed NE based on the output signal Scr from the crank angle sensor 70 and then the charging efficiency η in correspondence with the rotation speed NE and the intake air amount Ga. The charging efficiency η is a parameter by which the amount of air charged in the combustion chamber 24 is determined.

An intake phase difference control process M14 is a process of outputting an operating signal MS4 to operate the intake valve timing adjusting device 44 such that the intake phase difference DIN is controlled to achieve the target intake phase difference DIN*.

A target opening degree setting process M16 is a process of setting a target value of the opening degree of the throttle valve 14 (a target opening degree TAt) based on the accelerator operating amount ACCP. Specifically, the target opening degree setting process M16 sets the target opening degree TAt greater when the accelerator operating amount ACCP is great than when the accelerator operating amount ACCP is small.

A retarding process M18 is a process of calculating a retarded opening degree TAr by retarding the target opening degree TAt by a predetermined retarding time. A throttle control process M20 is a process of outputting an operating signal MS1 to operate the throttle valve 14 such that the opening degree TA, which is detected by the throttle sensor 74, is controlled to achieve the retarded opening degree TAr.

If the actual opening degree TA is controlled to achieve the target opening degree TAt, the actual opening degree TA changes with a delay with respect to a change in the target opening degree TAt. To address this, a low pass filter M22 is a process of outputting a processed primary delay of the target opening degree TAt as a predicted opening degree TAe.

A throttle model M24 is a process of calculating a throttle flow rate mt based on an intake air pressure Pm1, the predicted opening degree TAe, and the atmospheric pressure Pa. The intake air pressure Pm1 is calculated by a process that will be discussed below. The throttle flow rate mt is the amount of air passing through the throttle valve 14. Specifically, the throttle model M24 determines a greater throttle flow rate mt when the atmospheric air pressure Pa is high than when the atmospheric air pressure Pa is low and a smaller throttle flow rate mt when the intake air pressure Pm1 is high than when the intake air pressure Pm1 is low. Also, the throttle model M24 determines a greater throttle flow rate mt when the predicted opening degree TAe is great than when the predicted opening degree TAe is small. Specifically, the throttle model M24 calculates the throttle flow rate mt based on a model expression that relates the predicted opening degree TAe, the atmospheric pressure Pa, and the intake air pressure Pm1, each as an input parameter, to the throttle flow rate mt as an output parameter. Specifically, the model expression is not restricted to an expression directly relating the aforementioned input parameters to the output parameter. That is, for example, the expression may have a coefficient that is set variably by means of an input parameter.

An intake manifold model M26 is a process of calculating the intake air pressure Pm1 based on a valve closing inflow air amount Mc1 and the throttle flow rate mt. The valve closing inflow air amount Mc1 is calculated by a process that will be discussed below. The valve closing inflow air amount Mc1 is the value obtained by subtracting the amount of air blown back into the intake passage 12 by the time the intake valve 18 closes from the amount of air flowing into the combustion chamber 24 in a single combustion cycle. Specifically, the intake manifold model M26 determines the intake air pressure Pm1 such that the increase speed of the intake air pressure Pm1 becomes greater when the value obtained by subtracting the valve closing inflow air amount Mc1 from the throttle flow rate mt is great than when the aforementioned value is small.

An intake valve model M28 is a process of calculating the valve closing inflow air amount Mc1 based on the intake air pressure Pm1, the intake phase difference DIN, and the rotation speed NE. The intake valve model M28 determines a greater valve closing inflow air amount Mc1 when the intake air pressure Pm1 is high than when the intake air pressure Pm1 is low. Also, when the valve closing timing of the intake valve 18 is retarded with respect to BDC due to the intake phase difference DIN, the intake valve model M28 determines a smaller valve closing inflow air amount Mc1 as the valve closing timing of the intake valve 18 becomes more retarded with respect to BDC.

A steady-state value correcting process M30 is a process of calculating a correction amount ΔPm based on the intake air amount Ga and the opening degree TA. The correction amount ΔPm is used to correct the intake air pressure Pm1 to the value corresponding to the intake air amount Ga in a steady state. A correcting process M32 is a process of calculating the intake air pressure Pm by subtracting the correction amount ΔPm from the intake air pressure Pm1. The intake air pressure Pm in the steady state is equal to the intake air pressure determined from the intake air amount Ga. In a transient state, the intake air pressure Pm is a value that prioritize the responsiveness of the intake air pressure Pm1.

The steady-state value correcting process M30 may be performed by carrying out the two processes described below, for example, as processes of estimating the intake air pressure, and then determining the difference between the obtained values as the correction amount ΔPm. That is, a first estimating process is a process that uses models similar to the throttle model M24, the intake manifold model M26, and the intake valve model M28 and employs the opening degree TA, instead of the predicted opening degree TAe, as an input. A second estimating process is a process that uses models similar to the intake manifold model M26 and the intake valve model M28 and employs the intake air amount Ga, instead of the throttle flow rate mt, as an input. Specifically, the intake air pressure estimated by the first estimating process is an intake air pressure based on the amount corresponding to the throttle flow rate mt in the steady state. The correction amount ΔPm in the steady state is thus a value that corrects an error in the throttle flow rate mt with respect to the intake air amount Ga. At the transient stage, the responsiveness of the intake air pressure estimated by the first estimating process approximates the responsiveness of the intake air pressure estimated by the second estimating process. This causes changes in the intake air pressure Pm1 to be conspicuous in the intake air pressure Pm at the transient stage.

An intake valve model M34 is a process of calculating a valve closing inflow air amount Mc as an output parameter based on the intake air pressure Pm, the intake phase difference DIN, and the rotation speed NE each as an input parameter. The input parameters used by the intake valve model M34 are different from the input parameters used by the intake valve model M28. However, the intake valve model M38 calculates the output parameter based on the input parameters by the process similar to the process performed by the intake valve model M28.

The valve closing inflow air amount Mc is a predicted amount of air that will be drawn into the combustion chamber 24 after a predetermined time period from the current point of time. Specifically, while the throttle valve 14 is currently controlled to achieve the retarded opening degree TAr, the valve closing inflow air amount Mc represents a value at the time the opening degree of the throttle valve 14 is controlled to achieve the target opening degree TAt.

An injection valve operating process M36 is a process of obtaining the valve closing inflow air amount Mc, the intake phase difference DIN, the rotation speed NE, the intake air pressure Pm, and the air-fuel ratio Af and operating the port injection valve 16 and the direct injection valve 26. Specifically, the injection valve operating process M36 controls the air-fuel ratio of the air-fuel mixture to be burned in the combustion chamber 24 to achieve a target value by injecting fuel from the port injection valve 16 and the direct injection valve 26.

Figure 3:
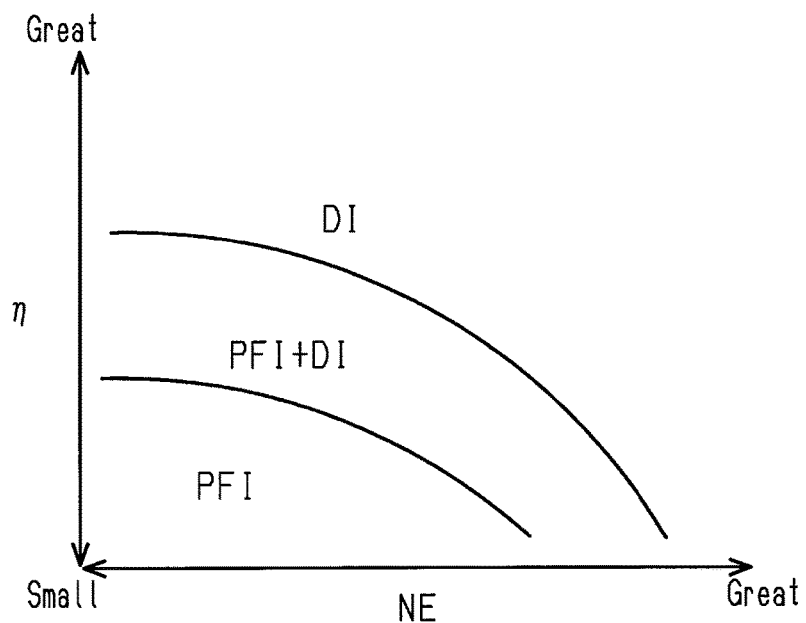
FIG. 3 is a diagram representing the setting of injection distribution in the engine of FIG. 1.

FIG. 3 represents the distribution of the injection amount necessary for controlling the air-fuel ratio of the fuel mixture as the control target to the target value between the port injection valve 16 and the direct injection valve 26. As represented in the graph, in the present embodiment, in the range in which the charging efficiency η is not greater than a specific value, only port injection (referred to as PFI in the graph), which is fuel injection from the port injection valve 16, is carried out. In the range in which the charging efficiency η is not smaller than a predetermined value that is greater than the specific value, only direct injection (referred to as DI in the graph), which is fuel injection from the direct injection valve 26, is conducted. The greater the rotation speed NE, the smaller the specific value and the predetermined value both become. In contrast, in the range in which the charging efficiency η is greater than the specific value and smaller than the predetermined value, both the port injection and the direct injection (referred to as PFI+DI in the graph) is performed.

In the present embodiment, the port injection is carried out before the intake valve 18 open in order to increase the degree of mixing between fuel and air in the air-fuel mixture in the combustion chamber 24. The port injection is advantageous in increasing the degree of mixing in the air-fuel mixture. The direct injection is advantageous in improving the charging efficiency by enhancing the cooling effect in the combustion chamber 24 using latent heat of evaporation. Considering the respective advantages, the distribution setting of the injection amount is optimized.

Figure 4:
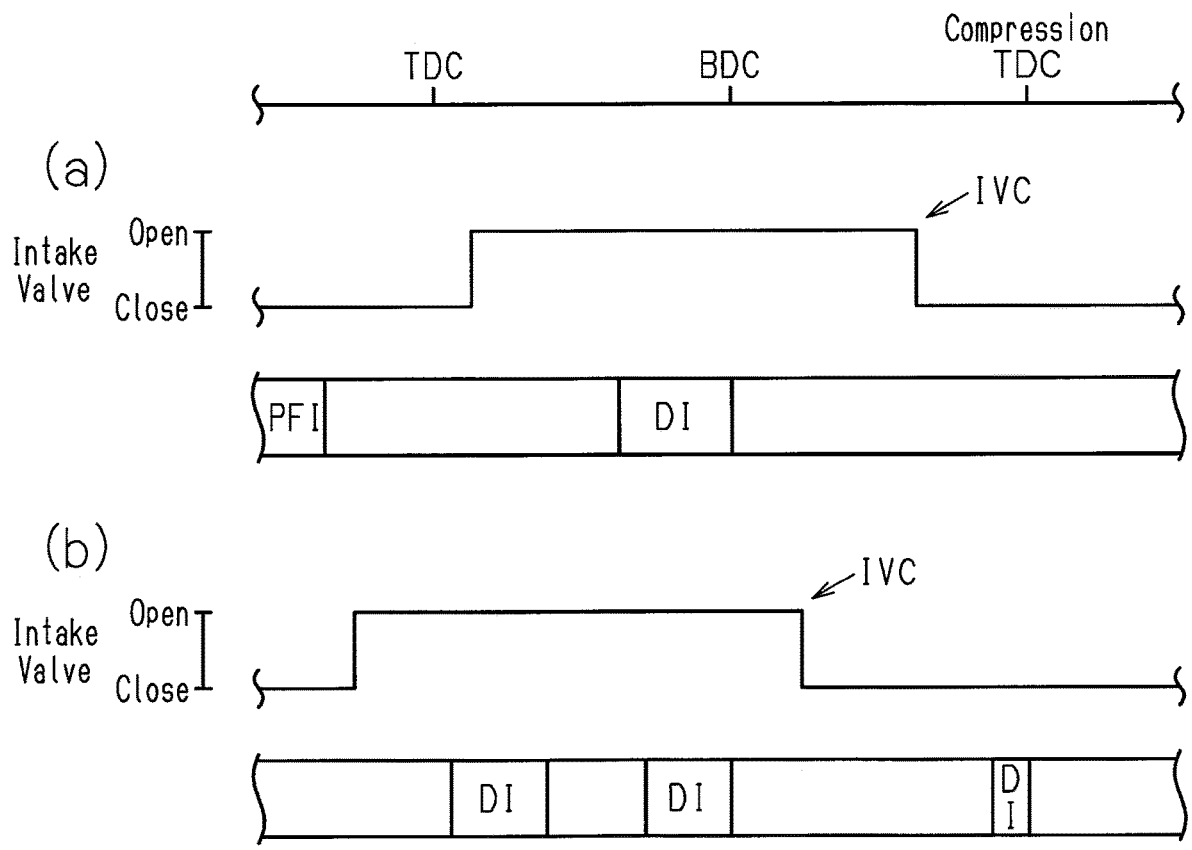
FIG. 4 is a timing diagram, in which Sections (a) and (b) each represents fuel injection in the engine of FIG. 1.

In FIG. 4, Section (a) represents an example in which the port injection and the direct injection are each performed by one time, while Section (b) represents an example in which the direct injection is repeated three times. In the present embodiment, depending on the operating point of the engine 10, multiple times of fuel injections are carried out for each of the cylinders in every one of the combustion cycles. The number of times of injection and the starting timings of injection are variably set in correspondence with the operating point of the engine 10. Also, referring to FIG. 4, in the present embodiment, the CPU 62 variably sets the intake valve closing timing IVC to be retarded with respect to the dead bottom center BDC and the retardation amount to become great. In this manner, the opening degree of the throttle valve 14 is maximally increased to decrease pumping loss, particularly in a range in which the charging efficiency η is small.

Figure 5:
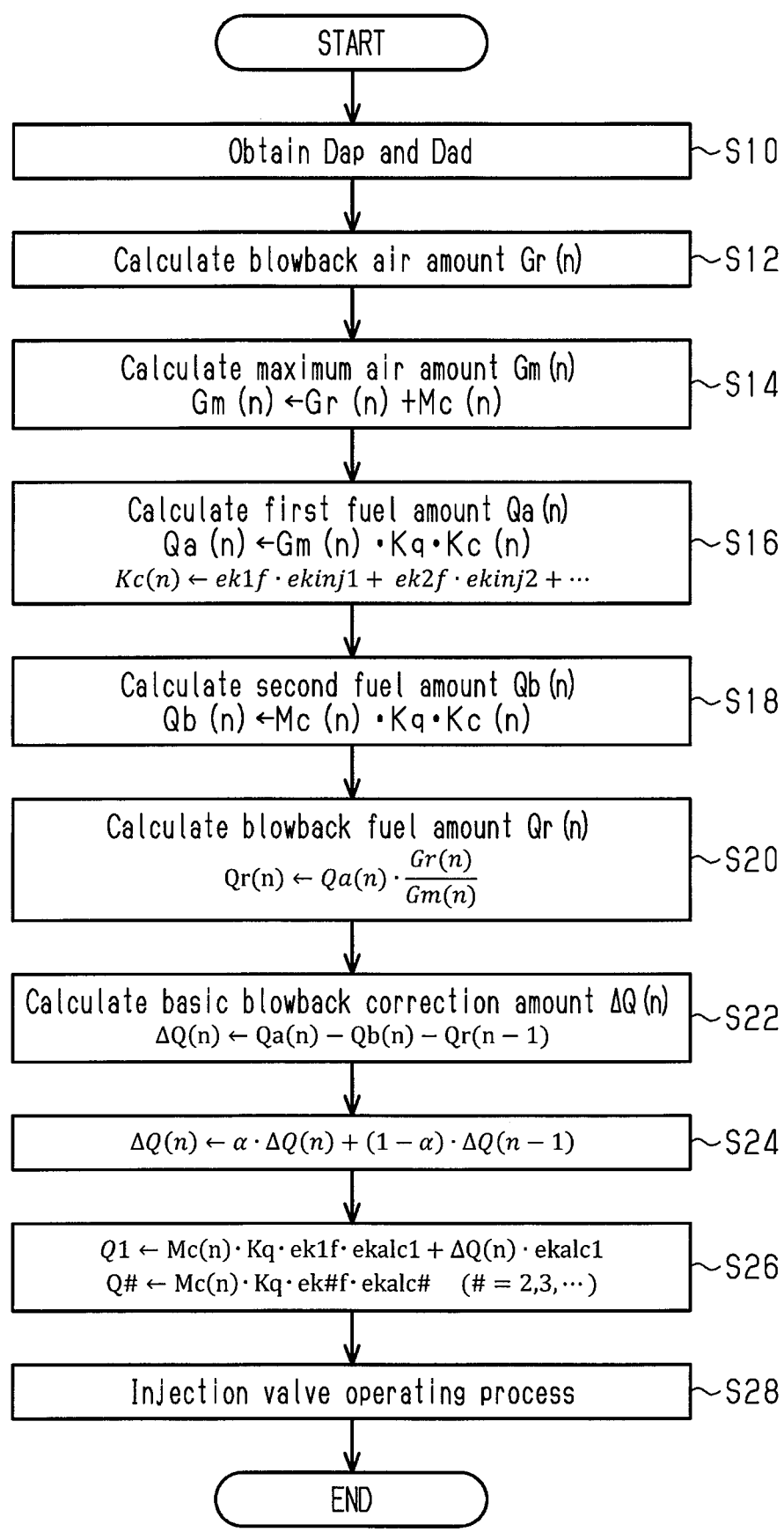
FIG. 5 is a flowchart representing the steps of an injection valve operating process in the engine of FIG. 1.

FIG. 5 shows the steps of the injection valve operating process M36. The process is accomplished by executing a program stored in the ROM 64 by means of the CPU 62. Specifically, the process of FIG. 5 is carried out before fuel injection is started, once in every combustion cycle for each cylinder in the engine 10. Hereinafter, reference numerals starting with "S" each represent a step number of the process.

In the series of processes illustrated in FIG. 5, the CPU 62 first obtains a port concentration Dap and an in-cylinder concentration Dad (S10). The CPU 62 then calculates a blowback air amount Gr(n) (S12). The blowback air amount Gr(n) is the amount of air that is part of the air flowing into the combustion chamber 24 and is blown back into the intake passage 12 before the intake valve closing timing IVC when the intake valve 18 opens. The variable n indicates that the corresponding value is the value in the currently performed combustion cycle at the time the process of FIG. 5 is performed. The variable n−1, for example, indicates that the value is the value in the combustion cycle immediately before the current combustion cycle.

The CPU 62 calculates the blowback air amount Gr(n) based on the intake valve closing timing IVC of the intake valve 18, the rotation speed NE, and the intake air pressure Pm. Specifically, the ROM 64 stores map data defining the relationship between the intake valve closing timing IVC, the rotation speed NE, and the intake air pressure Pm each as an input parameter and the blowback air amount Gr as an output parameter. The CPU 62 carries out map calculation to determine the blowback air amount Gr(n). Specifically, map data is group data that includes discrete values of an input variable and values of an output variable corresponding to the respective values of the input variable. If a certain value of the input variable matches any one of the values of the input variable in the map data, for example, the corresponding value of the output variable in the map data is determined to be the result of map calculation. If not, the value obtained through interpolation between multiple values of the output variable in the map data is determined to be the result of map calculation.

Figure 6:
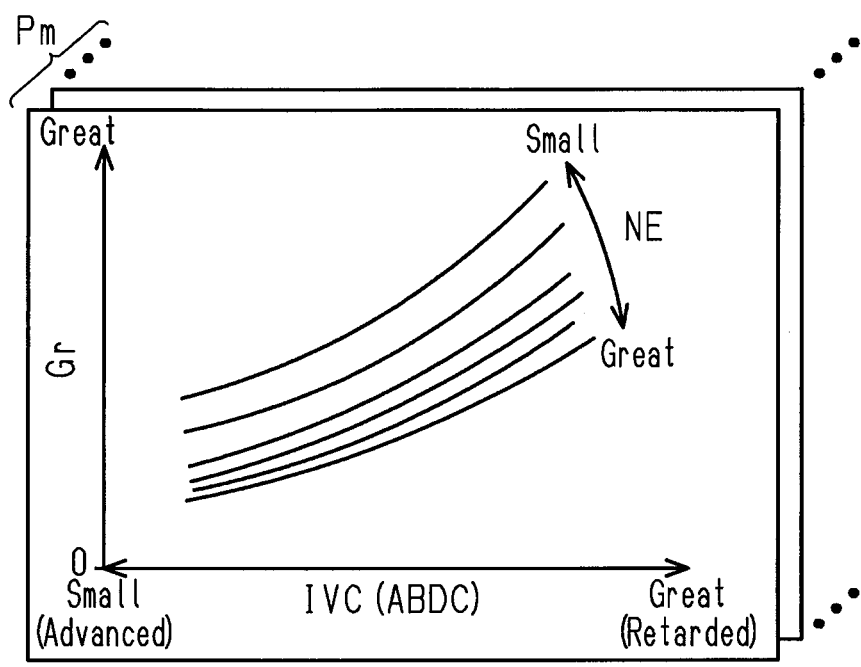
FIG. 6 is a diagram representing map data by which a blowback air amount is determined in the engine of FIG. 1.

The tendency indicated by the map data is schematically represented in FIG. 6. With reference to the diagram, the blowback air amount Gr is greater when the intake valve closing timing IVC is retarded than when the intake valve closing timing IVC is advanced. The blowback air amount Gr is also greater when the rotation speed NE is small than when the rotation speed NE is great. The blowback air amount Gr is also greater when the intake air pressure Pm is high than when the intake air pressure Pm is low. Specifically, the intake air pressure Pm is calculated in the process of FIG. 2 as the value after the predetermined time period. The intake air pressure Pm as the input of S12 is thus the value at the timing closest to the timing at which the intake valve 18 closes in the target cylinder. Further, the intake valve closing timing IVC is determined depending exclusively on the intake phase difference DIN. Therefore, the CPU 62 calculates the intake valve closing timing IVC in correspondence with the intake phase difference DIN.

Referring to FIG. 5, the CPU 62 calculates a maximum air amount Gm(n) using the following expression (c1) (S14). The maximum air amount Gm(n) is the maximum amount of air flowing into the combustion chamber 24 in one combustion cycle.

$$Gm(n)=Gr(n)+Mc(n) \quad (c1)$$

The valve closing inflow air amount Mc(n) is thus a predicted value of the amount of air maintained in the combustion chamber 24 when the intake valve 18 closes in the corresponding cylinder. Specifically, the valve closing inflow air amount Mc(n) in the expression (c1) is calculated in the process of FIG. 2 as the value after the predetermined time period.

Subsequently, the CPU 62 calculates a first fuel amount Qa based on the maximum air amount Gm(n), using the following expression (c2) (S16).

$$Qa(n)=Gm(n) \cdot Kq \cdot Kc(n) \quad (c2)$$

The conversion coefficient Kq is a value by which the air amount is multiplied to be converted into a fuel amount necessary for controlling the air-fuel ratio of air-fuel mixture of air by the air amount and fuel with an alcohol concentration of 0% to achieve the target value. The target value may be, for example, a stoichiometric air-fuel ratio. The correction coefficient Kc is the sum of products of the injection proportion ek*f (*=1, 2, ... ) of the fuel injected in one cylinder in one combustion cycle and an injection timing correction coefficient ekinj*. The injection timing correction coefficient ekinj* is a correction coefficient corresponding to the starting timing of the corresponding fuel injection. Specifically, if port injection is performed only once in one combustion cycle, for example, the initial-time injection proportion ek1f is 1 and the second-time and subsequent injection proportions ek2f, ek3f, ... are all zero. In contrast, if fuel injection is performed three times in one combustion cycle, for example, as illustrated in Section (b) of FIG. 4, the initial-time injection proportion ek1f, the second-time injection proportion ek2f, and the third-time injection proportion ek3f are all greater than 0 and smaller than 1 and values corresponding to the respective proportions of injection. The injection timing correction coefficient ekinj* will be discussed below with reference to S22.

Next, the CPU 62 calculates a second fuel amount Qb(n) based on the valve closing inflow air amount Mc(n) using the following expression (c3) (S18).

$$Qb(n)=Mc(n) \cdot Kq \cdot Kc(n) \quad (c3)$$

The CPU 62 then calculates a blowback fuel amount Qr(n) using the following expression (c4).

$$Qr(n)=Qa(n) \cdot \{Gr(n)/Gm(n)\} \quad (c4)$$

Subsequently, the CPU 62 calculates a basic blowback correction amount ΔQ using the following expression (c5).

$$\Delta Q(n)=Qa(n)-\{Qb(n)+Qr(n-1)\} \quad (c5)$$

When fuel is injected by the amount Mc(n)·Kq, blowback may cause excess or deficiency of fuel with respect to the amount of fuel necessary for controlling the air-fuel ratio of air-fuel mixture of air by the valve closing inflow air amount Mc(n) and fuel with an alcohol concentration of 0% to achieve the target value. The basic blowback correction amount ΔQ is a correction amount by which such excess or deficiency is decreased. Specifically, the fuel amount Mc(n)·Kq is a fuel amount corresponding to the valve closing inflow air amount Mc(n), which is the amount of air in the air-fuel mixture to be burned. The fuel amount Mc(n)·Kq is corrected using the basic blowback correction amount ΔQ for the technical reasons described below.

The present embodiment is focused on the fact that, even though some of the air-fuel mixture in the combustion chamber 24 is blown back into the intake passage 12 before the intake valve closing timing IVC, the air-fuel ratio of the air-fuel mixture to be burned in the combustion chamber 24 can be controlled to achieve the target value by controlling the air-fuel ratio of the air-fuel mixture of air by the maximum air amount Gm(n) and fuel to achieve the target value under a certain condition. The condition is that all fuel is injected before the intake valve 18 opens and air and fuel are assumed to be in a homogeneous state in the combustion chamber 24 before blowback from the combustion chamber 24 into the intake passage 12 occurs. In this case, as long as the port injection valve 16 injects fuel such that the air-fuel ratio of the air-fuel mixture flowing into the combustion chamber 24 achieves the target value, the air-fuel ratio of the air-fuel mixture in the combustion chamber 24 is maintained to be the target value even after some of the air-fuel mixture is blown back from the combustion chamber 24 before the intake valve closing timing IVC. In the case, the excess or deficiency of the fuel by the air amount Mc(n)·Kq with respect to the fuel necessary for controlling the air-fuel ratio of the air-fuel mixture of air by the valve closing inflow air amount Mc(n) and fuel with an alcohol concentration of 0% to achieve the target value is corrected by the basic blowback correction amount ΔQ(n) for which the correction coefficient Kc is 1. That is, in this case, the first fuel amount Qa(n) is Gm(n)·Kq according to the above-described expression (c2) and the second fuel amount Qb(n) is Mc(n)·Kq according to the above-described expression (c3). Therefore, if the blowback fuel amount Qr(n-1) is zero, the basic blowback correction amount ΔQ is Qa(n)−Qb(n) according to the above-described expression (c5). The fuel amount Qa(n)−Qb(n) indicates that the fuel delivered into the combustion chamber 24 by the fuel amount Mc(n)·Kq is deficient with respect to the fuel necessary for controlling the air-fuel ratio of the air-fuel mixture of air by the maximum air amount Gm(n) and fuel with an alcohol concentration of 0% to achieve the target value. The fuel amount Qa(n)−Qb(n) thus corresponds to the deficiency amount of the aforementioned fuel delivered into the combustion chamber 24. Meanwhile, the fuel in the air-fuel mixture that has been blown back into the intake passage 12 in the previous cycle flows into the combustion chamber 24 in the current cycle. Considering this blown-back fuel, the correction amount necessary for ensuring fuel delivery into the combustion chamber 24 by the amount necessary for controlling the air-air-fuel ratio of the air-fuel mixture of air by the maximum air amount Gm(n) and fuel with an alcohol concentration of 0% to achieve the target value is the value determined using the above-described expression (c5).

As has been described, in the present embodiment, there may be cases in which multiple times of fuel injections are performed in one cylinder in one combustion cycle. In these cases, there may be a case in which fuel is injected after the intake valve closing timing IVC, as illustrated in Section (b) of FIG. 4. In this case, the fuel injected after the intake valve closing timing IVC is not involved in blowback. Therefore, instead of performing all of the multiple times of fuel injections such that the fuel necessary for controlling the air-fuel ratio of the air-fuel mixture of air by the maximum air amount Gm(n) and fuel with an alcohol concentration of 0% to achieve the target value is delivered to the combustion chamber 24, a process equivalent to the process of controlling the air-fuel ratio of the air-fuel mixture of air by the maximum air amount Gm(n) and fuel to achieve the target value may be performed exclusively before the intake valve closing timing IVC.

Hereinafter, the above-described case (in which the multiple times of fuel injections are performed including fuel injection after the intake valve closing timing IVC) will be described referring to a hypothetical case in which a single time of port injection is carried out before the intake valve 18 opens and a single time of direct injection is performed after the intake valve closing timing IVC. In this case, the injection proportion ek1f of the port injection as the initial-time injection and the injection proportion ek2f of the direct injection as the second-time injection are not zero so that ek1f+ek2f=1. The injection proportions ek3f, ek4f, . . . of the third-time and subsequent injections are zero. In the description below, the previous blowback fuel amount Qr(n−1) is ignored. In this case, to deliver the fuel necessary for controlling the air-fuel ratio of the air-fuel mixture of air by the maximum air amount Gm(n) and fuel with an alcohol concentration of 0% to achieve the target value to the combustion chamber 24 in separate two times, fuel may be injected by the amount Gm(n)·Kq/ek1f at the initial time and by the amount Gm(n)·Kq·ek2f at the second time. However, at the intake valve closing timing IVC after the initial-time fuel injection, the amount of air in the combustion chamber 24 is equal to the valve closing inflow air amount Mc(n). Further, if it can be assumed that fuel by the amount Gm(n)·Kq·ek1f and air by the maximum air amount Gm(n) are mixed homogeneously, the proportion of the amount of fuel that is part of the fuel injected by the amount Gm(n)·Kq·ek1f and remains in the combustion chamber 24 at the intake valve closing timing IVC is Mc(n)/Gm(n) in relation to the amount Gm(n)·Kq·ek1f. Therefore, the amount of fuel remaining in the combustion chamber 24 at the intake valve closing timing IVC is Mc(n)·Kq·ek1f. As a result, by injecting fuel by the amount Mc(n)·Kq·ek2f at the second-time fuel injection, the amount of fuel remaining in the combustion chamber 24 after the intake valve closing timing IVC is equalized to the amount Mc(n)·Kq. In this manner, the air-fuel ratio of the air-fuel mixture to be burned is controlled to achieve the target value.

On the other hand, if it can be assumed that fuel by the amount Gm(n)·Kq·ek1f and air by the maximum air amount Gm(n) are mixed homogeneously, the blowback fuel amount Qr(n) is Gr(n)/Gm(n) times of Gm(n)·Kq·ek1f, that is, {Gm(n)·Kq·ek1f}·Gr(n)/Gm(n). The blowback fuel amount Gr(n), which is {Gm(n)·Kq·ek1f}·Gr(n)/Gm(n), does not include information regarding the injection amount of the second-time injection. This fact can be represented by defining the injection timing correction coefficient ekinj*, which is employed in S16 and S18, as 1 for fuel injection sufficiently earlier than the intake valve closing timing IVC and as 0 for direct injection after the intake valve closing timing IVC.

Specifically, the later the injection timing is, the less likely the injected fuel will be blown back into the intake passage 12. Therefore, if the injection period includes a period on the retarded side of the bottom dead center, accuracy may be lowered by setting the proportion of the injected fuel corresponding to the blowback fuel amount Qr to Gr(n)/Gm(n), regardless of whether the injection timing correction coefficient ekinj* is set to 1 or 0. In this case, even if the air-fuel ratio of the air-fuel mixture of air by the maximum air amount Gm(n) and fuel is controlled to achieve the target value, the air-fuel ratio of the air-fuel mixture to be burned in the combustion chamber 24 cannot necessarily be controlled to achieve the target value if some of the air-fuel mixture in the combustion chamber 24 is blown back into the intake passage 12 before the intake valve closing timing IVC. However, in the present embodiment, the fuel injection timings are set such that this problem does not occur. That is, the present embodiment exclusively addresses cases in which the injection timing correction coefficient ekinj* is either 1 or 0.

The above-described expression (c5) can be transformed into the following expression (c6) according to the expressions (c1) to (c4).

$$\Delta Q(n) = Gm(n) \cdot Kq \cdot Kc(n) - Mc(n) \cdot Kq \cdot Kc(n) - Qr(n-1) \quad (c6)$$
$$= Gr(n) \cdot Kq \cdot Kc(n) - Qr(n-1)$$
$$= Gm(n) \cdot Kq \cdot Kc(n) \cdot Gr(n)/Gm(n) - Qr(n-1)$$
$$= Qr(n) - Qr(n-1)$$

The expression (c6) indicates that, if the fuel necessary for controlling the air-fuel ratio of the air-fuel mixture of air by the maximum air amount Gm(n) and fuel with an alcohol concentration of 0% to achieve the target value before the intake valve closing timing IVC is delivered to the combustion chamber 24, the basic blowback correction amount ΔQ is the change amount of the fuel in the air-fuel mixture blown back into the intake passage 12.

When S22 is complete, the CPU 62 substitutes the processed exponential moving average of the basic blowback correction amount ΔQ(n) calculated in the current execution of S22 for the basic blowback correction amount ΔQ(n) (S24). Specifically, it is in the steady state that all of the fuel by the blowback fuel amount Qr(n) satisfying the expression (c4) can flow into the combustion chamber 24 in the subsequent combustion cycle. That is, it is assumed that, at the transient stage, a change in the blowback fuel amount Qr caused by a change in the blowback air amount Gr is maintained in the subsequent cycle. Therefore, with this fact taken into consideration, α·ΔQ(n)+(1−a)·ΔQ(n−1) is employed as the final basic blowback correction amount ΔQ(n), using a weighting factor α greater than 0 and smaller than 1.

Subsequently, the CPU 62 calculates an initial-time injection-amount command value Q1 and second-time and subsequent injection-amount command values Q# (#=2, 3, . . . ) (S26). Specifically, the CPU 62 defines the second-time and subsequent injection-amount command values Q# each as Mc(n)·Kq·ek#f·ekalc#. In this value, the alcohol concentration correction coefficient ekalc# is a correction coefficient corresponding to alcohol concentration and is 1 for an alcohol concentration of 0%, becoming greater as the alcohol concentration becomes greater than 0%. For example, if the second-time injection is port injection, the alcohol concentration correction coefficient ekalc2 is calculated in correspondence with the port concentration Dap. If the second-time injection is direct injection, the alcohol concentration correction coefficient ekalc2 is calculated in correspondence with the in-cylinder concentration Dad.

The CPU 62 defines the initial-time injection-amount command value Q1 as Mc(n)·Kq·ek1f·ekalc1+ΔQ(n)·ekalc1. In this value, the alcohol concentration correction coefficient ekalc1 is a correction coefficient corresponding to alcohol concentration and is 1 for an alcohol concentration of 0%, becoming greater as the alcohol concentration becomes greater than 0%. If the initial-time injection is port injection, the CPU 62 calculates the alcohol concentration correction coefficient ekalc1 in correspondence with the port concentration Dap. If the initial-time injection is direct injection, the CPU 62 calculates the alcohol concentration correction coefficient ekalc1 in correspondence with the in-cylinder concentration Dad. Specifically, restrictedly before the intake valve closing timing IVC, the basic blowback correction amount ΔQ(n) is the deficiency amount of fuel with respect to the fuel necessary for controlling the air-fuel ratio of the air-fuel mixture of air by the maximum air amount Gm(n) and fuel to the target value. The value Mc·Kq·ek1f ekalc1 is thus corrected using the basic blowback correction amount ΔQ(n). That is, correction using the basic blowback correction amount ΔQ(n) is performed on the fuel injection in which the injection timing correction coefficient ekinj* is reliably 1, which is the initial-time fuel injection.

Specifically, restrictedly before the intake valve closing timing IVC, the correction amount ΔQ(n)·ekalc1 is the excess or deficiency amount of the fuel by the amount Mc·Kq·ek1f·ekalc1+Mc·Kq·ek2f·ekalc2+ . . . , with respect to the fuel necessary for controlling the air-fuel ratio of the air-fuel mixture of air by the maximum air amount Gm and fuel with a certain alcohol concentration to achieve the target value.

Then, the CPU 62 operates the corresponding one of the port injection valve 16 and the direct injection valve 26 with reference to the injection-amount command value Q* (S28).

When S28 is complete, the CPU 62 suspends the series of processes shown in FIG. 5. Once the series of processes of FIG. 5 is suspended, parameters including variable n are altered to parameters including variable n−1.

The operation and advantages of the present embodiment will hereafter be described.

Firstly, the description below is focused on a case in which the fuel injected from the port injection valve 16 and the fuel injected from the direct injection valve 26 both have an alcohol concentration of 0%.

FIG. 7A represents the steady state in which the intake valve closing timing IVC and the injection timing correction coefficient ekinj* remain constant. In this case, the previous blowback air amount Gr(n−1) is equal to the current blowback air amount Gr(n). Specifically, when the blowback air amount Gr and the injection timing correction coefficient ekinj* remain constant, the blowback fuel amount also remains constant. Therefore, simply by injecting fuel by the amount Mc(n)·Kq corresponding to the valve closing inflow air amount Mc(n) without using the basic blowback correction amount ΔQ, the air-fuel ratio is controlled to the target value.

FIG. 7B illustrates a case in which the injection proportion ek*f and the injection timing correction coefficient ekinj* remain constant but the current blowback air amount Gr(n) has increased as compared to the previous blowback air amount Gr(n−1) due to retardation of the intake valve closing timing IVC. In this case, the current blowback fuel amount Qr(n) is greater than the previous blowback fuel amount Qr(n−1). Therefore, if fuel is injected simply by the fuel amount Mc(n)·Kq corresponding to the valve closing inflow air amount Mc(n), the air-fuel ratio of the air-fuel mixture to be burned becomes lean. This also occurs as long as the injection timing correction coefficient ekinj* is constantly 1, regardless of a change in the injection proportion ek*f.

FIG. 7C shows a case in which the injection proportion ek*f and the injection timing correction coefficient ekinj* remain constant but the current blowback air amount Gr(n) has decreased as compared to the previous blowback air amount Gr(n−1) due to advancement of the intake valve closing timing IVC. In this case, the current blowback fuel amount Qr(n) is smaller than the previous blowback fuel amount Qr(n−1). Therefore, if fuel is injected by the fuel amount Mc(n)·Kq corresponding to the valve closing inflow air amount Mc(n), the air-fuel ratio of the air-fuel mixture to be burned becomes rich. This also occurs as long as the injection timing correction coefficient ekinj* is constantly 1, regardless of a change in the injection proportion ek*f.

However, in the present embodiment, fuel is injected by an amount increased from Mc(n)·Kq if the blowback air amount increases and by an amount decreased from Mc(n)·Kq if the blowback air amount decreases. This limits variation of the air-fuel ratio Af caused by a change in the intake valve closing timing IVC. That is, when the expression "Kc(n)=Kc(n−1)=Kc" is satisfied, that is, the correction coefficient Kc remains constant, the basic blowback correction amount ΔQ is represented by the following expression (c7), according to the above-described expression (c6).

$$\Delta Q(n) = Kq \cdot Kc \cdot Gr(n) - Kq \cdot Kc \cdot Gr(n-1) \quad \quad (c7)$$
$$= Kq \cdot Kc \cdot \{Gr(n) - Gr(n-1)\}$$

According to the expression (c7), the basic blowback correction amount ΔQ(n) is a positive value if the blowback air amount Gr(n) has increased with respect to the previous blowback air amount Gr(n−1) and is a negative value if the blowback air amount Gr(n) has decreased with respect to the previous blowback air amount Gr(n−1).

However, in the present embodiment, there may be cases in which the alcohol concentration of the fuel in the fuel tank 50 is greater than 0%. In these cases, by using the conversion coefficient Kq based on the presumption that the alcohol concentration is 0%, an air-fuel ratio appropriate for controlling exhaust gas components in a desirable manner cannot be achieved. Therefore, the CPU 62 performs correction corresponding to alcohol concentration in S26. Particularly, by setting the final correction amount related to blowback to ΔQ·ekalc1, the CPU 62 is allowed to carry out appropriate correction in correspondence with the alcohol concentration of the injected fuel.

If refueling is performed using fuel having an alcohol concentration different from the alcohol concentration of the fuel that has been retained in the fuel tank 50, the alcohol concentration of the fuel injected from the port injection valve 16 and the alcohol concentration of the fuel injected from the direct injection valve 26 may be mutually different for a certain period of time following the refueling. Even in this case, the present embodiment uses an alcohol concentration correction coefficient ekalc* calculated in correspondence with the port concentration Dap in the case of port injection and an alcohol concentration correction coefficient ekalc* calculated in correspondence with the in-cylinder concentration Dad in the case of direct injection. In this manner, fuel injection is carried out by an appropriate amount.

Figure 8:
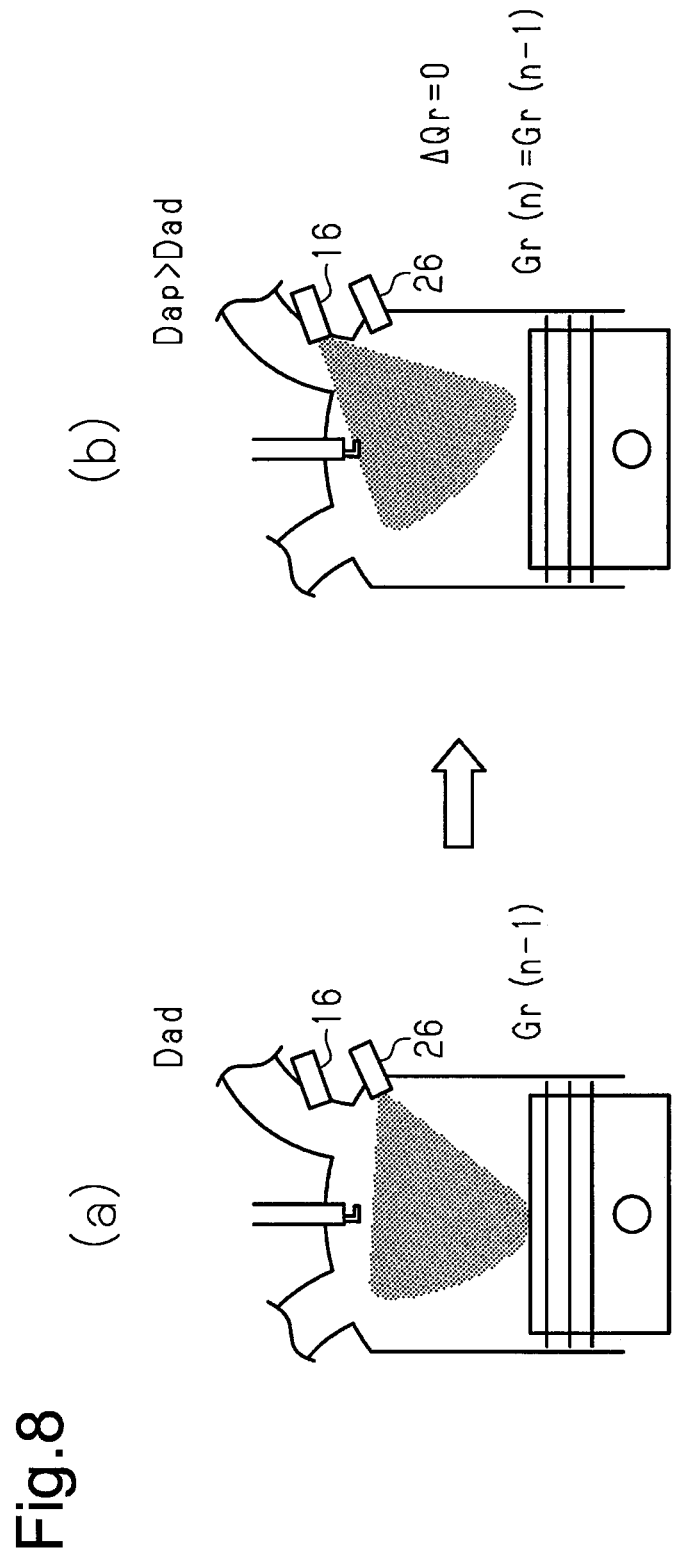
FIG. 8 is a diagram, in which Sections (a) and (b) illustrate a case in which injection from a direct injection valve is switched to injection from a port injection valve.

FIG. 8 illustrates an example of fuel injection after refueling with fuel having a smaller alcohol concentration than the fuel that has been retained in the fuel tank 50. Section (a) of FIG. 8 shows a state in which fuel is steadily injected exclusively from the direct injection valve 26 before the intake valve closing timing IVC. Section (b) of the drawing shows a state immediately after switching to fuel injection exclusively from the port injection valve 16 before the intake valve closing timing IVC. In this case, since a great amount of fuel is injected from the direct injection valve 26 after the aforementioned refueling, the in-cylinder concentration Dad is smaller than the port concentration Dap. However, if the blowback air amount Gr(n) at the time point at which the fuel injection switches to the fuel injection from the port injection valve 16 is equal to the previous blowback air amount Gr(n−1), the basic blowback correction amount ΔQ, which is calculated based on the presumption that the alcohol concentration is 0%, is zero. The value obtained by multiplying the basic blowback correction amount ΔQ by the alcohol concentration correction coefficient ekalc1 is thus also zero. Therefore, the CPU 62 performs fuel injection by an amount obtained by multiplying the valve closing inflow air amount Mc(n) by Kq·ek1f·ekalc1 as the injection-amount command value Q1 for the initial-time fuel injection, without carrying out the fuel amount correction related to blowback.

As a result, the exhaust gas components are controlled in a desirable manner.

If the correction coefficient Kc in S16 and S18 include the alcohol concentration correction coefficient ekalc*, the basic blowback correction amount ΔQ(n) in the state of Section (b) of FIG. 8, which is calculated in S22, is not zero but is Gr(n)·Kq·(ekalc1(n)−ekalc1(n−1)). The basic blowback correction amount ΔQ(n) is thus a positive value, due to a great alcohol concentration of the fuel injected in the current combustion cycle. As a result, the exhaust gas components cannot be controlled in a desirable manner.

Therefore, with reference to FIG. 8, a manner of obtaining exhaust gas characteristics for ensuring the stoichiometric air-fuel ratio, regardless of alcohol concentration, will be described. That is, before switching to the state shown in Section (b) of FIG. 8, the fuel amount may be deficient, depending on the manner of fuel injection in a combustion cycle, with respect to the exact amount of fuel necessary for reaction with the air by the valve closing inflow air amount Mc. However, since air is blown back by the blowback air amount Gr, the deficiency amount of the fuel amount is considered to be equalized to the amount of fuel that has been blown back in the previous cycle. If the blowback air amount Gr remains constant in the state of Section (b) of FIG. 8, the fuel amount that has been deficient for the above-described amount in the above-described manner should be compensated by the amount of fuel that has been blown back in the previous cycle, due to the air blown back by the blowback air amount Gr. Therefore, the correction amount related to the blowback air amount should be set to zero.

However, in the present embodiment, both the previous blowback fuel amount Qr(n−1) and the current blowback fuel amount Qr(n) are quantified in a manner standardized to the fuel with an alcohol concentration of 0%. The basic blowback correction amount ΔQ(n) is thus calculated correctly to be zero. In other words, the amount of excess or deficiency of fuel calculated in S22 is converted, regardless of alcohol concentration, into a value in the case of fuel having the stoichiometric air-fuel ratio of gasoline fuel with an alcohol concentration of 0%. This ensures the correct calculation of the basic blowback correction amount ΔQ(n), which is zero.

Second Embodiment

A second embodiment will now be described with reference to FIG. 9. The differences from the first embodiment will mainly be discussed.

In the present embodiment, all of fuel injections are performed before the intake valve 18 closes. The injection timing correction coefficient ekinj* (*=1, 2, . . . ) is presumed to be constantly 1.

FIG. 9 represents the steps of the injection valve operating process M36. The process is performed by executing a program stored in the ROM 64 by means of the CPU 62. The process is carried out once in every combustion cycle in each cylinder of the engine 10 before fuel injection is started. Some of the steps in FIG. 9 correspond to steps in FIG. 5 and thus are given the same step numbers as the corresponding steps of FIG. 5. Detailed description of these steps is omitted herein for descriptive purposes.

In the series of processes illustrated in FIG. 9, the CPU 62 calculates a correction coefficient Kc(n) in the following manner. The correction coefficient Kc(n) is used in S16a and S18a replacing S16 and S18, respectively, of FIG. 5. That is, the correction coefficient Kc(n) is the sum of the products of the injection proportion ek*f of the fuel injected in one cylinder in one combustion cycle and the alcohol concentration correction coefficient ekalc* of the corresponding fuel injection. In this case, even if the blowback air amount Gr is constant, the current blowback fuel amount Qr(n) and the previous blowback fuel amount Qr(n−1) may differ from each other due to variation in alcohol concentration, for example, in the case illustrated in FIG. 8.

Therefore, in S22a replacing S22, the CPU 62 converts the previous blowback fuel amount Qr(n−1) from a value in the case in which the correction coefficient Kc is the previous correction coefficient Kc(n−1) into a value in the case in which the correction coefficient Kc is the current correction coefficient Kc(n). This processing corresponds to the difference in the blowback fuel amount in a case in which the alcohol concentration of the fuel blown back in the previous cycle and the alcohol concentration of the fuel blown back in the current cycle are both alcohol concentrations corresponding to the alcohol concentration correction coefficient equal to the value: ek1f(n)·ekinj1(n)·ekalc1(n)+ ek2f(n)·ekinj2(n)·ekalc2(n)+ . . . . In other words, the processing corresponds to the difference in the blowback fuel amount in the case in which the fuel has an air-fuel ratio different from that of the first embodiment and the fuel blown back in the previous cycle and the fuel blown back in the current cycle have an equal stoichiometric air-fuel ratio.

Therefore, if the blowback air amount Gr remains constant, the basic blowback correction amount ΔQ is zero. Then, in S26a replacing S26, the CPU 62 sets the correction amount related to the blowback corresponding to the initial-time injection-amount command value Q1 to ΔQ(n)·ekalc1/Kc(n). This value is equal to the correction amount determined in S26 in the case in which the injection timing correction coefficient ekinj* is constantly 1.

That is, the basic blowback correction amount ΔQ(n) calculated in S22a is represented by the following expression.

$$\Delta Q(n) = Gr(n) \cdot Kq \cdot Kc(n) - Gr(n-1) \cdot Kq \cdot Kc(n)$$

Therefore, ΔQ(n)·ekalc1/Kc(n) is equal to {Gr(n)−Gr(n−1)}·Kq·ekalc1. As is clear from the above-described expression (c7), this value is equal to the value calculated in S26 in the case in which the injection timing correction coefficient ekinj* is constantly 1.

<Correspondence>

The correspondence between the items in the above embodiments and the items described in the above SUM- MARY is as follows. Below, the correspondence is shown for each of the numbers in the examples described in the above SUMMARY.

[1] and [2] The blowback air amount calculating process corresponds to S12. The obtaining process corresponds to S10.

The operating process corresponds to S14 to S28 of FIG. 5 and S14, S16a, S18a, S20, S22a, S24, S26a, and S28 of FIG. 9.

[3] The excess/deficiency amount calculating process corresponds to S22 of FIG. 5 and S22a of FIG. 6.

[4] Setting the injection amount of the initial-time fuel injection as the correction target corresponds to S26 of FIG. 5 and S26a of FIG. 6.

[5] The processing of Example 5 corresponds to calculation in S26 and S26a of the alcohol concentration correction coefficient ekalc# based on the port concentration Dap as the port injection information or the in-cylinder concentration Dad as the direct injection information.

Other Embodiments

The present embodiment may be modified as follows. The above-described embodiment and the following modifications can be combined as long as the combined modifications remain technically consistent with each other.

Regarding Obtaining Process

In the above-illustrated embodiments, the controller 60 obtains the port concentration Dap and the in-cylinder concentration Dad, which are detected by the port alcohol concentration sensor 80 and the in-cylinder alcohol concentration sensor 82, respectively. However, the present disclosure is not restricted to this. For example, the alcohol concentration in the low-pressure delivery pipe 52 and the alcohol concentration in the high-pressure delivery pipe 56 may be estimated and the estimated values may be obtained by the controller 60, as will be described below by way of example. That is, an alcohol concentration sensor is deployed in a common section for the low-pressure delivery pipe 52 and the high-pressure delivery pipe 56 in the fuel passage delivering fuel from the fuel tank 50 into the low-pressure delivery pipe 52 and the high-pressure delivery pipe 56. The CPU 62 calculates a concentration Dab in a branch section at which the fuel passage is branched into a low-pressure passage section connected to the low-pressure delivery pipe 52 and a high-pressure passage section connected to the high-pressure delivery pipe 56. Specifically, the CPU 62 defines, as the concentration in the branch section, the alcohol concentration detected at the time point at which the integrated sum of the amount of fuel injected from the port injection valve 16 and the amount of fuel injected from the direct injection valve 26 is small by the amount corresponding to the volume of the section in the fuel passage from the location of the alcohol concentration sensor to the branch section. The CPU 62 also defines, as the alcohol concentration of the fuel flowing into the low-pressure delivery pipe 52, the concentration Dab in the branch section at the time point at which the integrated amount of fuel injected from the port injection valve 16 is small by the amount corresponding to the volume of the low-pressure passage section. Then, the CPU 62 estimates the alcohol concentration in the low-pressure delivery pipe 52 on the presumption that, as fuel is injected from the port injection valve 16, the fuel flows into the low-pressure delivery pipe 52 by the amount equal to the amount of the injected fuel. Further, the CPU 62 also defines, as the alcohol concentration of the fuel flowing into the high-pressure delivery pipe 56, the concentration Dab in the branch section at the time point at which the integrated amount of fuel injected from the direct injection valve 26 is small by the amount corresponding to the volume of the high-pressure passage section. Then, the CPU 62 estimates the alcohol concentration in the high-pressure delivery pipe 56 on the presumption that, as fuel is injected from the direct injection valve 26, the fuel flows into the high-pressure delivery pipe 56 by the amount equal to the amount of the injected fuel. As will be discussed below, an estimating process similar to the above-described estimating process may be employed even in a case in which the engine 10 includes only either the port injection valve 16 or the direct injection valve 26 and has an alcohol concentration sensor in the fuel passage.

Although the alcohol concentration (Dap, Dad, Dab) is obtained as stoichiometric air-fuel ratio information in the above-illustrated embodiments, the present disclosure is not restricted to this.

Regarding Maximum Air Amount Calculating Process

Although the maximum air amount Gm is calculated based on the blowback air amount Gr and the valve closing inflow air amount Mc in the above-illustrated embodiments, the disclosure is not restricted to this. For example, the maximum air amount Gm may be calculated using an equation representing a state of gas. Specifically, the maximum air amount Gm may be calculated using the volume Vm of the interior of the combustion chamber 24 at BDC, a gas constant R, the molecular weight M (g/mol), and the in-cylinder temperature Tm, according to the following expression (c8).

$$Gm = \{(Pm \cdot Vm)/(R \cdot Tm)\} \cdot M \cdot \{NE/(60 \cdot 2)\} \tag{c8}$$

In the expression (c8), the coolant temperature may be substituted for the in-cylinder temperature Tm. The volume Vm may be a value obtained by subtracting the volume of the interior of the combustion chamber 24 at TDC from the volume of the interior of the combustion chamber 24 at BDC.

Regarding Blowback Air Amount Calculating Process

In the above-illustrated embodiments, the intake valve closing timing IVC is used as the parameter representing the valve actuation of the intake valve that determine the valve closing timing, which is included in the input parameters for calculating the blowback air amount Gr. However, the disclosure is not restricted to this. For example, the intake phase difference DIN may be used as the aforementioned parameter. Also, as will be described below in "Regarding Variable Valve Actuation Device," a lift amount may be used as the input parameter as long as the lift amount is variable.

If the maximum air amount Gm is calculated without using the blowback air amount Gr, as described above in "Regarding Maximum Air Amount Calculating Process," for example, the blowback air amount Gr may be defined as the difference between the maximum air amount Gm and the valve closing inflow air amount Mc.

In a case without a variable valve actuation device, as will be discussed below in "Regarding Variable Valve Actuation Device," a parameter representing the actuation of the intake valve is unnecessary for calculating the blowback air amount Gr. Also, in a case in which setting is performed such that dependence on the rotation speed NE decreases, as in a case of an internal combustion engine mounted in a series hybrid vehicle capable of controlling to limit the rotation speed range, the rotation speed NE does not have to be used in calculation of the blowback air amount Gr.

The input parameter(s) of the blowback air amount calculating process is (are) not restricted to the solely employed intake air pressure or to the intake air pressure combined with at least either the parameter representing the valve actuation of the intake valve by which the valve closing timing is determined or the rotation speed NE. The input parameters of the blowback air amount calculating process may include an intake air temperature as added to the above-listed value(s). To obtain the intake air temperature, an intake-air-temperature sensor may be deployed and a value detected by the intake-air-temperature sensor may be used.

The blowback air amount calculating process does not necessarily have to be based on the intake air pressure. The blowback air amount may be calculated using, for example, the opening degree TA or the predicted opening degree TAe of the throttle valve 14, the intake phase difference DIN, and the rotation speed NE. To perform such calculation, map data including the opening degree TA or the predicted opening degree TAe, the intake phase difference DIN, and the rotation speed NE each as an input parameter and the blowback air amount Gr as an output parameter may be stored in the ROM 64.

The blowback air amount calculating process does not necessarily have to use the map data stored in the ROM 64. For example, function data including an independent variable as an input parameter and a dependent variable as an output parameter may be stored in the ROM 64. The function data is used in the blowback air amount calculating process.

The intake air pressure used to calculate the blowback air amount Gr is not restricted to a value predicted using the models (the air models) illustrated in FIG. 2. For example, a target flow-in air amount may be set in correspondence with the accelerator operating amount ACCP as a target value of the valve closing inflow air amount Mc. The target opening degree TAt is then calculated using the inverse model (the inverse air model) of the aforementioned air model in correspondence with the target flow-in air amount. Alternatively, a target of the intake air pressure Pm, which is an intake air pressure calculated using the reverse air model, may also be used. However, in this case, considering delay in response, it is desirable that the target of the intake air pressure Pm be a low-pass-filter-processed value. Alternatively, an intake air pressure sensor may be employed and a value detected by the intake air pressure sensor may be used. In this case, the value detected by the intake air pressure sensor may be low-pass-filter-processed and used. This enables use of a value with a limited pulsation component.

Regarding Injection Timing Correction Coefficient

Although the injection timing correction coefficient ekinj* is 0 or 1 in the process of FIG. 5, the present disclosure is not restricted to this. For example, in a case in which fuel injection is performed such that the opening period of the intake valve 18 includes a period retarded with respect to the bottom dead center, the injection timing correction coefficient ekinj* may be a value greater than 0 and smaller than 1. Also, in the process of FIG. 9, the injection timing correction coefficient ekinj* may be set to any value greater than 0 and smaller or equal to 1. However, in this case, the excess/deficiency amount calculating process is changed to any of the processes listed in "Regarding Excess/Deficiency Amount Calculating Process". In these cases, the injection timing correction coefficient ekinj* is not a value that precisely determines the proportion of injected fuel contributing to the blowback fuel amount Qr but is adapted to a value that allows the basic blowback correction amount ΔQ to ensure a highly accurate control on the air-fuel ratio.

If the injection timing correction coefficient ekinj* is a value between 0 and 1, the CPU 62 calculates the injection timing correction coefficient ekinj* based on the injection starting timing, the intake valve closing timing IVC, and the rotation speed NE. Specifically, map data defining the relationship between the injection starting timing, the intake valve closing timing IVC, and the rotation speed NE each as an input parameter and the injection timing correction coefficient ekinj* as an output parameter may be stored in the ROM 64. The CPU 62 then perform map calculation to obtain the injection timing correction coefficient ekinj*. Specifically, the injection timing correction coefficient ekinj* is 1 if the injection starting timing is advanced by an amount greater than or equal to a predetermined amount. The injection timing correction coefficient ekinj* becomes smaller as the injection starting timing becomes less advanced. The injection timing correction coefficient ekinj* becomes 0 when the injection starting timing is retarded by a certain amount. Also, the injection timing correction coefficient ekinj* is set greater when the rotation speed NE is small than when the rotation speed is great.

Regarding Excess/Deficiency Amount Calculating Process

The blowback fuel amount Qr does not necessarily have to be calculated based on the first fuel amount Qa. The blowback fuel amount Qr may be obtained by, for example, multiplying the blowback air amount Gr, which is determined in S12, by Kq·Kc.

In the excess/deficiency amount calculating process, the excess or deficiency amount does not necessarily have to be the difference between the previous value and the current value of the blowback fuel amount Qr that is obtained through conversion into values in the case with an alcohol concentration of 0%, as shown in FIG. 5, or the difference between the previous value and the current value of the blowback fuel amount Qr that are standardized using the current correction amount Kc(n), as represented in FIG. 9. For example, if the injection timing correction coefficient ekinj* can be assumed to be constantly 1 as in the second embodiment, the difference between the current blowback air amount Gr(n) and the previous blowback air amount Gr(n−1) may be defined as "the excess or deficiency amount obtained by converting the difference between the amount of fuel blown back from the combustion chamber into the intake passage before the intake valve closes and the amount of fuel that has been blown back in the previous cycle into a value in the case in which the stoichiometric air-fuel ratio of the fuel is the specific value". The thus determined excess or deficiency amount corresponds to the difference between the amount of fuel that should be blown back in the current cycle and the amount of fuel that has been blown back in the previous cycle in a case of hypothetical fuel having a stoichiometric air-fuel ratio of 1.

As has been described in "Regarding Injection Timing Correction Coefficient," if the injection timing correction coefficient ekinj* is greater than 0 and smaller than 1 in the process of FIG. 5, the basic blowback correction amount ΔQ does not serve to control the air-fuel ratio of the air-fuel mixture of air by the maximum air amount and fuel to achieve the target value. However, even in this case, the basic blowback correction amount ΔQ is a value that cancels the difference between the amount of fuel that should be blown back in the current cycle and the amount of fuel that has been blown back in the previous cycle in a case in which the stoichiometric air-fuel ratio of the fuel is a predetermined value.

As has been described in "Regarding Injection Timing Correction Coefficient," to allow the injection timing correction coefficient ekinj* to be set to any value greater than 0 and smaller than or equal to 1 in the process of FIG. 9, the injection timing correction coefficient ekinj* should be included in the correction coefficient Kc. Specifically, the correction coefficient Kc is the sum of products of the injection proportion ek*f, the injection timing correction coefficient ekinj* in the corresponding fuel injection, and the alcohol concentration correction coefficient ekalc* in the corresponding fuel injection. In this case, the basic blowback correction amount ΔQ is the difference between the current blowback amount and the previous blowback amount of hypothetical fuel having an alcohol concentration in which the alcohol concentration correction coefficient is Kc. The stoichiometric air-fuel ratio of the hypothetical fuel is the stoichiometric air-fuel ratio in a case in which the fuel has an alcohol concentration in which the alcohol concentration correction coefficient is Kc.

Regarding Amount of Air in Air-Fuel Mixture as Combustion Target

In the above-illustrated embodiments, the valve closing inflow air amount Mc is calculated as the amount of air in the air-fuel mixture to be burned once in every combustion cycle for each of the cylinders. However, the present disclosure is not restricted to this. For example, for each cylinder, the valve closing inflow air amount Mc may be calculated sequentially by a cycle shorter than 720° C.A. In this case, if multiple times of fuel injections are performed in each cylinder in every combustion cycle, for example, the injection amount may be calculated using valve closing inflow air amounts Mc determined at mutually different timings in the initial-time fuel injection and the second-time fuel injection.

The amount of air in the air-fuel mixture to be burned does not necessarily have to be calculated using an air model. For example, in a configuration including an intake air pressure sensor, the amount of air in the air-fuel mixture to be burned may be calculated using map data or function data in which the detection value of the intake air pressure sensor, the rotation speed NE, and the intake phase difference DIN are input parameters and the amount of air in the air-fuel mixture to be burned is an output parameter.

Regarding Operating Process

Although the correction target of the basic blowback correction amount ΔQ is the initial-time fuel injection in the above-illustrated embodiments, the present disclosure is not restricted to this. For example, if the injection timing correction coefficient ekinj* is 1 in the second-time and subsequent fuel injections, any one of the second-time and subsequent fuel injections may be the correction target.

Regarding Controller

The fuel injection control device is not limited to a device that includes the CPU 62 and the ROM 64 and executes software processing. For example, at least part of the processes executed by the software in the above-illustrated embodiments may be executed by hardware circuits dedicated to executing these processes (such as ASIC). That is, the controller may be modified as long as it has any one of the following configurations (a) to (c). (a) A configuration including a processor that executes all of the above-described processes according to programs and a program storage device such as a ROM (including a non-transitory computer readable medium) that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. Software processing circuits each including a processor and a program storage device and dedicated hardware circuits may be provided. That is, the above processes may be executed in any manner as long as the processes are executed by processing circuitry that includes at least one of a set of one or more software processing circuits and a set of one or more dedicated hardware circuits.

Regarding Variable Valve Actuation Device

The variable valve actuation device is not restricted to the intake valve timing adjusting device 44, which varies the opening timing of the intake valve 18 while maintaining a constant change in the lift amount with respect to changes in the opening timing and rotational angle of the intake valve 18. For example, the variable valve actuation device may be a device that changes the maximum lift amount of the intake valve. In this case, the variable valve actuation device can be set to increase the blowback air amount by changing the maximum lift amount in a manner retarding the valve closing timing of the intake valve 18 and to decrease the blowback air amount by changing the maximum lift amount in a manner advancing the valve closing timing of the intake valve 18. This effectively ensures the increasing or decreasing of the fuel injection amount based on the blowback air amount Gr.

However, the controller does not necessarily have to include a variable valve actuation device. Even without a variable valve actuation device, the in-cylinder flow-in air amount at the closing time of the intake valve 18 may be increased by increasing the opening degree of the throttle valve 14, for example, if the closing time of the intake valve 18 is retarded with respect to the bottom dead center. In this case, the blowback air amount is also increased. Therefore, the increasing or decreasing of the fuel injection amount based on the blowback air amount Gr is effectively ensured.

Other Modifications

The engine 10 does not necessarily have to include the throttle valve 14. Also, the engine 10 does not necessarily have to include both of the port injection valve 16 and the direct injection valve 26 and may include only either the port injection valve 16 or the direct injection valve 26.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A controller for an internal combustion engine, wherein the engine includes a fuel injection valve that injects and delivers fuel into a combustion chamber, and a valve closing timing of an intake valve of the engine can be retarded with respect to a bottom dead center, the controller being configured to perform:
- a blowback air amount calculating process of calculating a blowback air amount, wherein the blowback air amount is an amount of air that is part of the air that has flowed into the combustion chamber and is blown back into an intake passage before the intake valve closes;
- an obtaining process of obtaining a stoichiometric air-fuel ratio information of fuel injected from the fuel injection valve based on information detected by a sensor located at the fuel injection valve or at a fuel passage delivering fuel to the fuel injection valve; and
- an operating process of operating the fuel injection valve to control an air-fuel ratio of air-fuel mixture to be burned in the combustion chamber to a target value, wherein
  the operating process includes a process that, if the blowback air amount increases,
    causes the fuel injection valve to inject fuel by an amount increased with respect to a fuel amount for a case in which the blowback air amount remains constant, wherein the fuel is injected from a fuel tank via the fuel injection valve, and the amount increased for the fuel injected is determined based on an increase amount of the blowback air compared to a previous cycle and the obtained stoichiometric air-fuel ratio of the fuel injected from the fuel injection valve, and
    sets an increase amount of the fuel injected from the fuel injection valve greater when the obtained stoichiometric air-fuel ratio of the fuel injected from the fuel injection valve is small than when the obtained stoichiometric air-fuel ratio of the fuel injected from the fuel injection valve is great.

2. The controller according to claim 1, wherein
the operating process includes a process in which, if the blowback air amount decreases,
  the fuel injection valve is caused to inject fuel by an amount decreased with respect to the fuel amount for the case in which the blowback air amount remains constant, and
  a decrease amount of the fuel injected from the fuel injection valve is set greater when the obtained stoichiometric air-fuel ratio of the fuel injected from the fuel injection valve is small than when the obtained stoichiometric air-fuel ratio of the fuel injected from the fuel injection valve is great.

3. The controller according to claim 2, wherein:
the operating process includes an excess/deficiency amount calculating process of calculating an excess/deficiency amount obtained by converting a difference obtained by subtracting an amount of fuel that was blown back in a previous cycle from an amount of fuel that is blown back before the intake valve closes into a value for a case in which the stoichiometric air-fuel ratio of the fuel is assumed to be a specific value,
if the excess/deficiency amount is a positive value, the operating process
  causes the fuel injection valve to inject fuel by an amount increased with respect to a fuel amount for a case in which the excess/deficiency amount is zero, and
  sets the increase amount of the fuel injected from the fuel injection valve greater when the obtained stoichiometric air-fuel ratio of the injected fuel is small than when the obtained stoichiometric air-fuel ratio of the injected fuel is great, and
if the excess/deficiency amount is a negative value, the operating process
  causes the fuel injection valve to inject fuel by an amount decreased with respect to the fuel amount for the case in which the excess/deficiency amount is zero, and
  sets the decrease amount of the fuel injected from the fuel injection valve greater when the obtained stoichiometric air-fuel ratio of the injected fuel is small than when the obtained stoichiometric air-fuel ratio of the injected fuel is great.

4. The controller according to claim 3, wherein
the operating process includes
  a process of performing a plurality of times of fuel injections to control the air-fuel ratio of the air-fuel mixture to be burned in the combustion chamber to the target value, and
  a process in which, when the plurality of times of fuel injections are carried out, a correction target that is corrected in correspondence with the excess/deficiency amount is an initial-time fuel injection amount.

5. The controller according to claim 1, wherein:
the fuel injection valve includes a port injection valve that injects fuel into the intake passage and a direct injection valve that injects fuel into the combustion chamber,
the sensor includes a sensor located at the port injection valve or at a fuel passage delivering fuel to the port injection valve and a sensor located at the direct injection valve or at a fuel passage delivering fuel to the direct injection valve,
the obtaining process is a process of separately obtaining
  port injection information, from the sensor located at the port injection valve or at the fuel passage delivering fuel to the port injection valve, as stoichiometric air-fuel ratio information of the fuel injected from the port injection valve, and
  direct injection information, from the sensor located at the direct injection valve or at the fuel passage delivering fuel to the direct injection valve, as stoichiometric air-fuel ratio information of the fuel injected from the direct injection valve, and
the operating process includes a process that
  sets the amount of fuel injected from the port injection valve greater when the stoichiometric air-fuel ratio of the fuel corresponding to the port injection information is small than when the stoichiometric air-fuel ratio of the fuel corresponding to the port injection information is great, and
  sets the amount of fuel injected from the direct injection valve greater when the stoichiometric air-fuel ratio of the fuel corresponding to the direct injection information is small than when the stoichiometric air-fuel ratio of the fuel corresponding to the direct injection information is great.

6. A control method for an internal combustion engine, wherein the engine includes a fuel injection valve that injects and delivers fuel into a combustion chamber, and a valve closing timing of an intake valve of the engine can be retarded with respect to a bottom dead center, the method comprising:
calculating a blowback air amount, wherein the blowback air amount is an amount of air that is part of the air that has flowed into the combustion chamber and is blown back into an intake passage before the intake valve closes;

obtaining a stoichiometric air-fuel ratio information of fuel injected from the fuel injection valve based on information detected by a sensor located at the fuel injection valve or at a fuel passage delivering fuel to the fuel injection valve; and operating the fuel injection valve to control an air-fuel ratio of air-fuel mixture to be burned in the combustion chamber to a target value, wherein the operating the fuel injection valve includes a process that, if the blowback air amount increases, causes the fuel injection valve to inject fuel by an amount increased with respect to a fuel amount for a case in which the blowback air amount remains constant, wherein the fuel is injected from a fuel tank via the fuel injection valve, and the amount increased for the fuel injected is determined based on an increase amount of the blowback air compared to a previous cycle and the obtained stoichiometric air-fuel ratio of the fuel injected from the fuel injection valve, and sets an increase amount of the fuel injected from the fuel injection valve greater when the obtained stoichiometric air-fuel ratio of the fuel injected from the fuel injection valve is small than when the obtained stoichiometric air-fuel ratio of the fuel injected from the fuel injection valve is great.

7. A non-transitory computer readable memory medium storing a program that causes a controller to execute a control process for an internal combustion engine, wherein the engine includes a fuel injection valve that injects and delivers fuel into a combustion chamber, and a valve closing timing of an intake valve of the engine can be retarded with respect to a bottom dead center, the control process comprising:

calculating a blowback air amount, wherein the blowback air amount is an amount of air that is part of the air that has flowed into the combustion chamber and is blown back into an intake passage before the intake valve closes;

obtaining a stoichiometric air-fuel ratio information of fuel injected from the fuel injection valve based on information detected by a sensor located at the fuel injection valve or at a fuel passage delivering fuel to the fuel injection valve; and operating the fuel injection valve to control an air-fuel ratio of air-fuel mixture to be burned in the combustion chamber to a target value, wherein the operating the fuel injection valve includes a process that, if the blowback air amount increases, causes the fuel injection valve to inject fuel by an amount increased with respect to a fuel amount for a case in which the blowback air amount remains constant, wherein the fuel is injected from a fuel tank via the fuel injection valve, and the amount increased for the fuel injected is determined based on an increase amount of the blowback air compared to a previous cycle and the obtained stoichiometric air-fuel ratio of the fuel injected from the fuel injection valve, and sets an increase amount of the fuel injected from the fuel injection valve greater when the obtained stoichiometric air-fuel ratio of the fuel injected from the fuel injection valve is small than when the obtained stoichiometric air-fuel ratio of the fuel injected from the fuel injection valve is great.

8. The controller according to claim 1, wherein:

the internal combustion engine is configured to use fuel containing hydrocarbon fuel and alcohol, and the obtained stoichiometric air-fuel ratio of injected fuel tends to be smaller as an alcohol concentration of the injected fuel is greater.

9. The controller according to claim 1, wherein the information detected by the sensor located at the fuel injection valve or at the fuel passage delivering fuel to the fuel injection valve includes an alcohol concentration of the fuel injected from the fuel injection valve.

10. The controller according to claim 5, wherein:

the port injection information obtained from the sensor located at the port injection valve or at the fuel passage delivering fuel to the port injection valve includes an alcohol concentration of the fuel injected from the port injection valve, and the direct injection information obtained from the sensor located at the direct injection valve or at the fuel passage delivering fuel to the direct injection valve includes an alcohol concentration of the fuel injected from the direct injection valve.

* * * * *